US012755063B2

(12) United States Patent
Alameh et al.

(10) Patent No.: US 12,755,063 B2
(45) Date of Patent: Oct. 6, 2026

(54) SYSTEM AND METHOD FOR PREVENTING RECORDED VOICE ACCESS TO AN INFORMATION HANDLING SYSTEM USING A CONTEXTUAL ENGINE

(71) Applicant: Dell Products LP, Round Rock, TX (US)

(72) Inventors: Rachid M. Alameh, Crystal Lake, IL (US); Edward J. Yurchik, Jr., Algonquin, IL (US); Jarrett Simerson, Northbrook, IL (US); Daniel L. Hamlin, Round Rock, TX (US)

(73) Assignee: DELL PRODUCTS LP, Round Rock, TX (US)

(*) Notice: Subject to any disclaimer, the term of this patent is extended or adjusted under 35 U.S.C. 154(b) by 59 days.

(21) Appl. No.: 19/039,199

(22) Filed: Jan. 28, 2025

(65) Prior Publication Data

US 2026/0220313 A1 Jul. 30, 2026

(51) Int. Cl.
*G06F 21/83* (2013.01)
*G10L 25/54* (2013.01)

(52) U.S. Cl.
CPC .............. *G06F 21/83* (2013.01); *G10L 25/54* (2013.01); *G06F 2221/2111* (2013.01)

(58) Field of Classification Search
CPC ... G06F 21/83; G06F 2221/2111; G10L 25/54
See application file for complete search history.

(56) References Cited

U.S. PATENT DOCUMENTS 7,224,786 B2 * 5/2007 Daugherty ............. G06Q 20/40 379/88.19
8,804,958 B2 * 8/2014 Gudenus .............. G10K 11/178 713/176

(Continued)

FOREIGN PATENT DOCUMENTS

GB 2575873 A * 1/2020 ......... G10L 21/0224
JP 2026024211 A * 2/2026

(Continued)

*Primary Examiner* — Mohammed Waliullah

(74) *Attorney, Agent, or Firm* — Prol Intellectual Property Law, PLLC; H. Kenneth Prol

(57) ABSTRACT

A system and method to prevent passive voice access to the information handling system using a recorded voice includes a microphone to capture buffered acoustical background sounds in a sliding audio buffer and current passive voice access attempt including current acoustical background sounds. A hardware processor executing computer-readable program code of a context gathering module to capture operating conditions of the information handling system and environmental context where the information handling system is deployed, and provide, as input, the sensed operating conditions of the information handling system and environmental context of a contextual environment identification landscape to a contextual environment ML model to generate a context matching score. A voice contextual comparison module generates a voice background matching score and determines when the voice background matching score and the context matching score meet or exceed a threshold access authorization confidence score to determine if access should be granted to the information handling system.

20 Claims, 5 Drawing Sheets

(56) References Cited

U.S. PATENT DOCUMENTS

| | | | | |
|---|---|---|---|---|
| 11,462,200 | B2 * | 10/2022 | Osako | H04R 1/403 |
| 2005/0060157 | A1 * | 3/2005 | Daugherty | G07C 9/37<br>704/273 |
| 2009/0177495 | A1 | 7/2009 | Abousy | |
| 2018/0321905 | A1 | 11/2018 | Fountaine | |
| 2019/0212976 | A1 | 7/2019 | Fountaine | |
| 2020/0068031 | A1 | 2/2020 | Kursun | |
| 2020/0128081 | A1 | 4/2020 | Alameh | |
| 2021/0193151 | A1 | 6/2021 | Song | |
| 2023/0161853 | A1 | 5/2023 | Nair | |
| 2023/0344828 | A1 | 10/2023 | Sloane | |
| 2024/0032863 | A1 | 2/2024 | Horseman | |
| 2024/0127850 | A1 * | 4/2024 | Rosenwein | G10L 21/0208 |
| 2024/0184868 | A1 | 6/2024 | Khadloya | |
| 2024/0355336 | A1 * | 10/2024 | Altaf | G06N 20/00 |
| 2024/0355337 | A1 * | 10/2024 | Altaf | G06N 20/00 |
| 2024/0363099 | A1 * | 10/2024 | Altaf | G10L 15/02 |
| 2024/0363103 | A1 * | 10/2024 | Altaf | G10L 15/08 |
| 2024/0363125 | A1 * | 10/2024 | Khoury | G10L 17/26 |

FOREIGN PATENT DOCUMENTS

| | | | | |
|---|---|---|---|---|
| WO | WO-2023242841 | A1 * | 12/2023 | G10L 21/0272 |
| WO | WO-2025079737 | A1 * | 4/2025 | G06F 16/683 |

* cited by examiner

SYSTEM AND METHOD FOR PREVENTING RECORDED VOICE ACCESS TO AN INFORMATION HANDLING SYSTEM USING A CONTEXTUAL ENGINE

FIELD OF THE DISCLOSURE

The present disclosure generally relates to execution of computer-readable program code instructions for preventing recorded access to an information handling system. The present disclosure more specifically relates systems and methods of preventing passive voice access to an information handling system using a recorded voice based on a contextual engine and machine learning architecture.

BACKGROUND

As the value and use of information continues to increase, individuals and businesses seek additional ways to process and store information. One option available are information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more workspace productivity applications such as for teleconferencing, word processing, sales systems, business software, gaming applications, or the like. In some embodiments, a voice interface via a microphone and speaker may be used with an information handling system for access and input commands.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
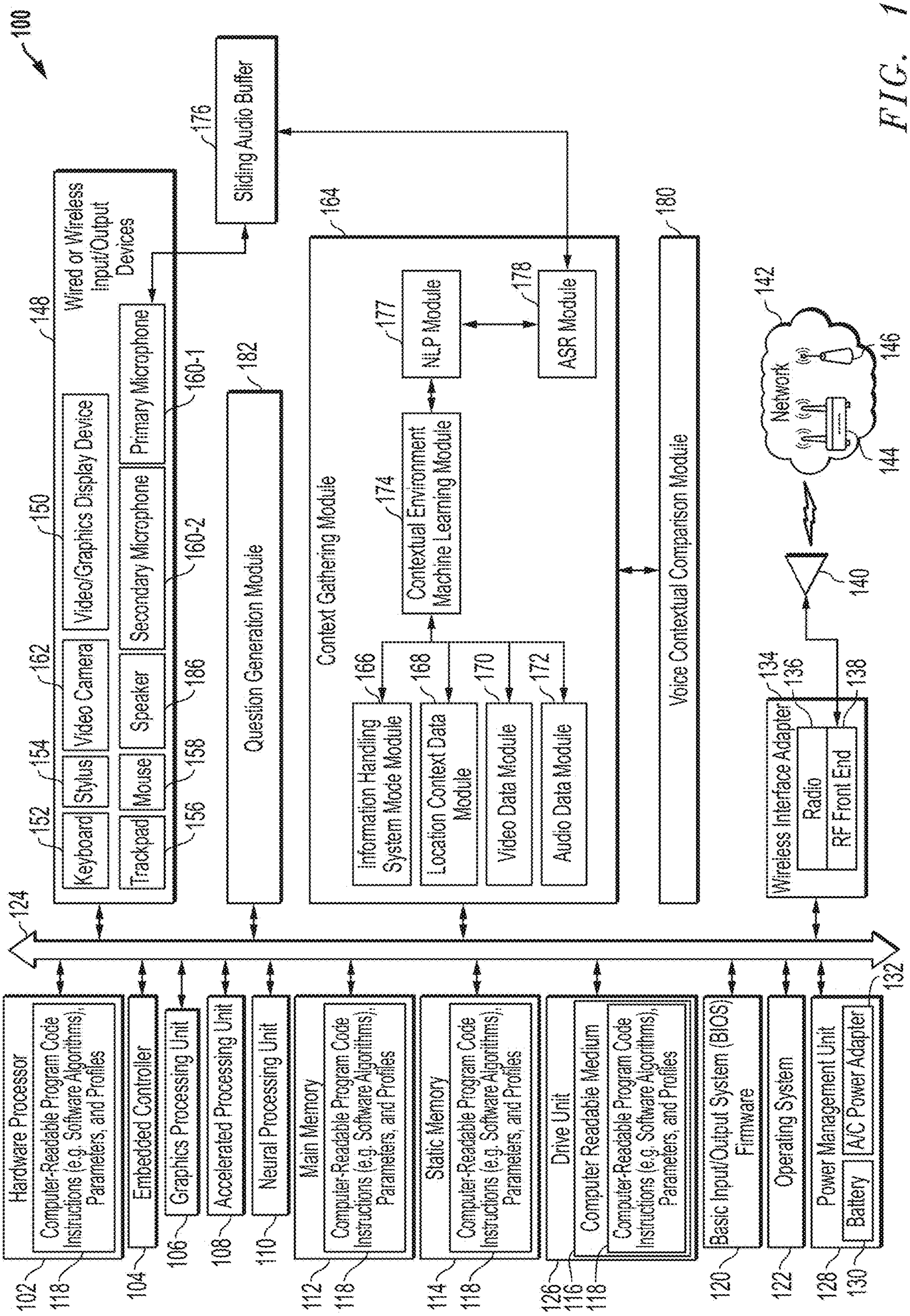
FIG. 1 is a block diagram illustrating an information handling system that includes computer-readable program code instructions of a context gathering module and voice contextual comparison module to prevent voice access with a recorded voice to the information handling system according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems provide for user-only access such that unauthorized users may not gain access to information stored on the information handling system. In an embodiment, passive voice listening offers a simplified user experience by passively registering a user by granting access to the information handling system during, for example, passive or active vocal engagement with the information handling system. This passive vocal engagement may be completed without the user speaking a triggering phrase or keyword in order to "wake" the information handling system or to provide voice commands for control of the information handling system. Instead, the information handling system may, via a microphone, passively listen to the environment around the information handling system and compare detected voice patterns and audio of a passive voice access attempt with those registered by the authorized user at the information handling system. In an embodiment, both passive voice registration and listening are collected under different contexts and tagged per context to improve system accuracy. In an embodiment, some audio samples are collected, for example, for quiet, noisy, mobile, and in-bag environments (e.g., in embodiments where the information handling system is placed in a bag) and voice access is also tagged for similar environments according to embodiments incorporated herein. Varying acoustical noise environments raise challenges for passive voice capture which limits the operation of the information handling system for access granting and voice controls to authorized users.

The present specification, therefore, describes systems and methods to prevent recorded voice being used for voice access or voice control with a passive voice access attempt to the information handling system. In an embodiment, the system may include a hardware processor, a data storage device, and a power management unit (PMU) to provide power to the hardware processor and data storage device. The system may also include a microphone to capture acoustical background sounds, with the hardware processor storing the acoustical background sounds on a sliding audio buffer. Further, the microphone may capture the passive voice access attempt to access the information handling system, such as after a period of inactivity has passed. In an embodiment, the hardware processor may execute computer-readable program code of a context gathering module to capture operating conditions of the information handling system and environmental context sensor data for the environment within which the information handling system is deployed and provide this contextual environment identification landscape, as input, the operating conditions data of the information handling system and environmental context sensor data for the information handling system is deployed within to a contextual environment machine learning (ML) model to generate a context matching score for a correlation confidence that the received passive voice access attempt is a live user's authorized voice and not a recording. This contextual environment identification landscape may define certain characteristics of the environment in which the information handling system is operating.

In an embodiment, the hardware processor may also execute computer-readable program code instructions of a voice contextual comparison module to compare the recently buffered acoustical background sounds to background noise within passive voice access attempt of the user captured by the microphone and generate a voice background matching score by comparing the acoustical background sounds received in the passive voice access attempt to the buffered background acoustical sounds recorded. A spectral analysis comparison may be made and may include comparison of characteristic noises in the buffered acoustical background sounds with the background noise in the passive voice access attempt. Further, the background noises in the passive voice access attempt may be compared further with expected acoustical background sounds from contextual input from environmental sensor data for those expected sounds within the contextual environment identification landscape to generate a context matching score. In an embodiment, the system herein combines the voice background matching score and the context matching score by adding, normalizing or otherwise relating these matching scores for correlation confidence levels of background noise match or context match and compares this to a threshold access authorization confidence score is used by the voice contextual comparison module to determine if access or control should be granted to the information handling system.

In an embodiment, computer-readable program code instructions of a question generation module may be executed by the hardware processor to present a question, selected from a plurality of questions, to the user and instructions to provide an oral response to the question. In this embodiment, the microphone may record the passive voice access attempt of the user including the oral response to the presented questions and determine, via the hardware processor executing the computer-readable program code instructions of the voice contextual comparison module, a generate the voice background matching score and the context matching score. The selected question and an expected answer may bar access if the answer is wrong or may be included in determining a context matching score by a machine learning (ML) module. The voice background matching score and the context matching score may be compared to a threshold access authorization confidence score relating to whether the passive voice access attempt is the live authorized user and not a recording. This threshold access authorization score is used to determine if access should be granted or control granted to the information handling system based on an oral voice response received to the question as well as the passive voice access attempt in some embodiments. This may add an additional layer of security against a recorded voice being used unless the generated question is known beforehand.

The system and method also includes a plurality of sensors that detect environmental and operational parameters at and around the information handling system. These sensors may be used to provide data to one or more of an information handling system mode module, a location data module, a video data module, and an audio data module. Each of the information handling system mode module, the location data module, the video data module, and the audio data module may be used to accumulate this data, process the various types of data, and pass the data to the contextual environment machine learning module to generate the contextual environment identification landscape. In this way, the computer-readable program code instructions of the voice contextual comparison module may distinguish when a passive voice recording recorded by an automatic speech recognition (ASR) module from a microphone is a playback of a recording of a user or the user speaking before the microphone before granting voice access and voice control over the information handling system in embodiments herein.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 144, a base station transceiver 146, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 112, (volatile (e.g., random-access memory, etc.), or static memory 114, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, a neural processing unit (NPU) 110, an accelerated processing unit (APU) 108, other types of hardware processing devices, or any combination thereof. It is appreciated that the information handling system 100 may include any number of hardware processing devices described herein. Computer readable code instructions stored in main memory 112 (e.g., RAM) may be accessible by hardware processing resources using that main memory 112. Computer-readable program code instructions stored in static memory 114, main memory 112, or drive unit 126 may be involved in invoking such computer-readable program code instructions to main memory 112 according to embodiments herein. Additional components of the information handling system 100 may include one or more storage devices such as static memory 114 or drive unit 126. The information handling system 100 may include or interface with one or more communications ports for communicating with external devices, as well as various wired or wireless input and output (I/O) devices 148, such as a mouse 158, a trackpad 156, a stylus 154, a keyboard 152, a video/graphics display device 150, a primary or secondary microphone 160-1, 160-2, speaker 161 or any combination thereof. Further, various wired or wireless input and output (I/O) devices 148, such as a primary or secondary microphone 160-1, 160-2, speaker 168, a trackpad 156, a stylus 154, a keyboard 152, a video/graphics display device 150, mouse 158, or any combination thereof may be integrated into the chassis of the information handling system 100 in other embodiments. Microphone 160-1 may be a beamforming microphone array in some embodiments that may be used in beamforming applications for determination of voice origination location versus background. In other embodiments, plural microphones 160-1 and 160-2 may be used for beamforming in embodiments herein. Portions of an information handling system 100 may themselves be considered information handling systems 100.

Information handling system 100 may include devices or modules that embody one or more of the devices or execute instructions for one or more systems and modules. The information handling system 100 may execute computer-readable program code instructions (e.g., software algorithms) parameters, and profiles 118 that may operate on servers or systems, remote data centers, or on-box in individual client information handling systems according to various embodiments herein. In some embodiments, it is understood any or all portions of computer-readable program code instructions (e.g., software algorithms) parameters, and profiles 118 may operate on a plurality of information handling systems 100.

The information handling system 100 may include the hardware processor 102 such as a central processing unit (CPU) or other hardware processing resources (e.g., 104, 106, 108, 110). Any of the hardware processing resources may operate to execute computer readable code instructions that are either firmware or software code, such as those software systems and modules described herein in execution of orchestrating a plurality of capabilities from plural AI productivity tool software module 162. Moreover, the information handling system 100 may include memory such as main memory 112, static memory 114, and disk drive unit 126 (volatile (e.g., random-access memory, etc.), nonvolatile memory (read-only memory, flash memory etc.) or any combination thereof or other memory with computer readable medium 116 storing computer-readable program code instructions (e.g., software algorithms) parameters, and profiles 118 executable by the hardware processor 102 (e.g., central processing unit), NPU 110, APU 108, EC 104, GPU 106, or any other hardware processing device. The information handling system 100 may also include one or more buses 124 operable to transmit communications between the various hardware components such as any combination of various wired or wireless I/O devices 148 as well as between hardware processors 102, an EC 104, the operating system (OS) 122, the basic input/output system (BIOS) 120, the wireless interface adapter 134, or a radio module, among other components described herein. In an embodiment, the hardware processor 102, EC 104, GPU 106, NPU 110, APU 108, and/or others may execute one or more bus drivers in order to transmit this data between the information handling system 100 and the wired or wireless input/output devices 148 described herein. In an embodiment, the information handling system 100 may be in wired or wireless communication with the wired or wireless I/O devices 148 such as a keyboard 152, a mouse 158, video/graphics display device 150, stylus 154, trackpad 156, primary or secondary microphone 160-1, 160-2, or speaker 186 among other peripheral devices.

As described herein, the information handling system 100 further includes a video/graphics display device 150. The video/graphics display device 150 in an embodiment may function as a liquid crystal display (LCD), an organic light emitting diode (OLED), a flat panel display, or a solid-state display. It is appreciated that the video/graphics display device 150 may be wired or wireless and may be an external video/graphics display device 150 that allows a user to increase the desktop area by extending the desktop in an embodiment. Additionally, as described herein, the information handling system 100 may include or be operatively coupled to a cursor control device (e.g., a trackpad 156, or gesture or touch screen input), a stylus 154, and/or a keyboard 152, among others that allows the user to interface with the information handling system 100 via the video/graphics display device 150. Information handling system 100 may also be operatively coupled to a wired or wireless input/output device 148 or other hardware devices that may include a hardware processing device such as a hardware processor, microcontroller, or other hardware processing resource. Various drivers and hardware control device electronics may be operatively coupled to operate the wired or wireless I/O devices 148 according to the embodiments described herein.

A network interface device of the information handling system 100 may be wired or wireless such as shown with wireless interface adapter 134 that can provide wireless connectivity among devices such as with Bluetooth® or to a network 142, e.g., a wide area network (WAN), a local area network (LAN), wireless local area network (WLAN), a wireless personal area network (WPAN), a wireless wide area network (WWAN), or other network. In embodiments described herein, the wireless interface device 134 with its radio 136, RF front end 138 and antenna 140 is used to communicate with the wireless peripheral devices, via, for example, a Bluetooth® or Bluetooth® Low Energy (BLE) protocols or any proprietary RF protocol such as those may utilize similar frequency ranges but proprietary modulation and data transmission characteristics. In embodiments, Bluetooth®, BLE, proprietary RF protocol, or other WPAN or WLAN protocols and plural such protocols may be used for communication with and among any wireless peripheral device to be paired or paired with the information handling system 100 or other information handling systems.

In other embodiments, a WAN, WWAN, LAN, and WLAN may each include an AP 144 or base station 146 used to operatively couple the information handling system 100 to a network 142 via a wireless interface adapter 134. In a specific embodiment, the network 142 may include macro-cellular connections via one or more base stations 146 or a wireless AP 144 (e.g., Wi-Fi), or such as through licensed or unlicensed WWAN small cell base stations 146. Connectivity may be via wired or wireless connection. For example, wireless network wireless APs 144 or base stations 146 may be operatively connected to the information handling system 100. Wireless interface adapter 134 may include one or more RF (RF) subsystems (e.g., radio 136) with transmitter/receiver circuitry, modem circuitry, one or more antenna RF (RF) front end 138 circuits, one or more wireless controller circuits, amplifiers, antennas 140 and other circuitry of the radio 136 such as one or more antenna ports used for wireless communications via multiple radio access technologies (RATs). The radio 136 may communicate with one or more wireless technology protocols.

In an embodiment, the wireless interface adapter 134 may operate in accordance with any wireless data communication standards. To communicate with a wireless local area network, standards including IEEE 802.11 WLAN standards (e.g., IEEE 802.11ax-2021 (Wi-Fi 6E, 6 GHZ)), IEEE 802.15 WPAN standards, WWAN such as 3GPP or 3GPP2, Bluetooth® standards, proprietary RF protocol, or similar wireless standards may be used. Wireless interface adapter 134 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 134 can represent an add-in card, wireless network interface module that is integrated with a main board of the information handling system 100 or integrated with another wireless network interface capability, or any combination thereof.

In some embodiments, a hardware processing resource executes computer-readable program code instructions of software or firmware to implement one or more of some systems and methods described herein, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware devices with related control and data signals that may be communicated between and through the modules, or as portions of an application-specific integrated circuit. Accordingly, the present system encompasses a hardware processing resource executing computer-readable program code instructions of software or firmware as well as hardware implementations or any combination.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable program code instructions, parameters, and profiles 118 or receives and executes computer-readable program code instructions, parameters, and profiles 118 responsive to a propagated signal, so that a hardware device connected to a network 142 may communicate voice, video, or data over the network 142. Further, the computer-readable program code instructions, parameters, and profiles 118 may be transmitted or received over the network 142 via the network interface device or wireless interface adapter 134.

The information handling system 100 may include a set of computer-readable program code instructions, parameters, and profiles 118 that may be executed to cause the computer system to perform any one or more of the methods or computer-based functions disclosed herein. For example, computer-readable program code instructions, parameters, and profiles 118 may be executed by a hardware processor 102, GPU 106, EC 104, APU 108, NPU 110, or any other hardware processing resource and may include software agents, or other aspects or components used to execute the methods and systems described herein. Various software modules comprising application computer-readable program code instructions, parameters, and profiles 118 may be coordinated by an operating system (OS) 122, and/or via an application programming interface (API) include a unified device API described herein. An example OS 122 may include Windows®, Android®, and other OS types. Example APIs may include Win 32, Core Java API, or Android APIs.

In an embodiment, the information handling system 100 may include a disk drive unit 126. The disk drive unit 126 and may include machine-readable program code instructions, parameters, and profiles 118 in which one or more sets of machine-readable program code instructions, parameters, and profiles 118 such as firmware or software can be embedded to be executed by the hardware processor 102 (e.g., CPU) or other hardware processing devices such as a GPU 106, an EC 104, an NPU 110, an APU 108, Codec/DSP or other hardware processing resource device to perform the processes described herein. Similarly, main memory 112 and static memory 114 may also contain a computer-readable medium for storage of one or more sets of machine-readable program code instructions, parameters, or profiles 118 described herein. The disk drive unit 126 or static memory 114 also contain space for data storage. Further, the machine-readable program code instructions, parameters, and profiles 118 may embody one or more of the methods as described herein. In a particular embodiment, the machine-readable program code instructions, parameters, and profiles 118 may reside completely, or at least partially, within the main memory 112, the static memory 114, and/or within the disk drive 126 during execution by the hardware processor 102, EC 104, APU 108, NPU 100, or GPU 106 of information handling system 100.

Main memory 112 or other memory of the embodiments described herein may contain computer-readable medium (not shown), such as RAM in an example embodiment. An example of main memory 112 includes random access memory (RAM) such as static RAM (SRAM), dynamic RAM (DRAM), non-volatile RAM (NV-RAM), or the like, read only memory (ROM), another type of memory, or a combination thereof. Static memory 114 may contain computer-readable medium (not shown), such as NOR or NAND flash memory in some example embodiments. The applications and associated APIs, for example, may be stored in static memory 114 or on the disk drive unit 126 that may include access to a machine-readable code instructions, parameters, and profiles 118 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 128 (a.k.a. a power supply unit (PSU)). The PMU 128 may include a hardware controller and executable machine-readable code instructions to manage the power provided to the components of the information handling system 100 such as the hardware processor 102 and other hardware components described herein. The PMU 128 may control power to one or more components including the one or more drive units 126, the hardware processor 102 (e.g., CPU), the EC 104, the GPU 106, the APU 108, the NPU 110, a video/graphic display device 150, or other wired or wireless I/O devices 148 such as the mouse 158, the stylus 154, the keyboard 152, primary or secondary microphone 160-1, 160-2, video camera 162, and the trackpad 156 and other components that may require power when a power button has been actuated by a user. In an embodiment, the PMU 128 may monitor power levels and power may be electrically coupled to the information handling system 100 via various ports in embodiments herein to provide this power. The PMU 128 may be coupled to the bus 124 to provide or receive data or machine-readable code instructions. The PMU 128 may regulate power from a power source such as the battery 130, or AC power adapter 132 such as from one or more ports 168, 170. In an embodiment, the battery 130 may be charged via the AC power adapter 132 and provide power to the components of the information handling system 100 when AC power from the AC power adapter 132 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 116 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 may include a context gathering module 164 (e.g., gathering background noise characterization/loudness, acoustic/sound characterization/classification, device location, user separation from device, device placement, user engagement with device, user motion, device operational mode-lid position, hardware state, environmental, location, privacy setting, user identity, among other context) and voice contextual comparison module 180 used to orchestrate data gathered by an information handling system mode module 166, a location data module 168, a video data module 170, and an audio data module 172 and determine whether a user is allowed to gain access to the information handling system 100. The passive voice listening system described herein may prevent access to the information handling system 100 by passive voice access attempt using a recorded voice used in place of an authorized user's live voice. The information handling system 100 executes computer-readable program code of the voice contextual comparison module 180 to evaluate both the context in which the information handling system is operating by a contextual environment machine learning ML module 174 as well as the background acoustical environment of the information handling system 100 and audio analysis of a voice picked up by a primary microphone 160-1 in a passive voice access attempt used to gain access to the information handling system 100. By using a contextual environment machine learning ML module 174 for example, the information handling system 100 may evaluate this environmental context in which the information handling system 100 is operating from sensors reporting to the context gathering module 164, evaluate the audio received at the primary microphone 160-1, and provide a context matching score determination. This context matching score is used with a voice background matching score from the voce contextual comparison module 180 to determine whether the audio received at the microphone 160-1 of a passive voice access attempt meets a threshold access authorization confidence score that is an authorized user's voice or is instead a pre-recorded audio by an unauthorized user that is now being used to access the information handling system 100. Such a threshold access authorization confidence score may require a 90%, 95%, or 98% confidence that the passive voice access attempt is genuine in an example embodiment or it may be deemed to be risk of being a recorded user's voice in some embodiments and reject or grant limited access to non-confidential data. Any threshold access authorization confidence score is contemplated for comparison against a combined voice background matching score and a context matching score.

During operation and after the information handling system 100 has been powered on or otherwise initialized, the hardware processor 102 of the information handling system 100 may cause that acoustical background sounds to be captured at the microphone 160-1 or 160-2 of the information handling system 100. These acoustical background sounds may include sounds that could be expected in a specific location where the information handling system 100 is present. For example, if the information handling system 100 was brought to a café, the acoustical background sounds may record sounds of a number of people within the café and other sounds that would be expected to be picked up by the microphone 160 in such a situation. Conversely, if the information handling system 100 was brought to an office building, other sounds such as typing, printers printing, and conversations may also be expected within the recorded acoustical background sounds.

In an embodiment, the hardware processor 102 may continuously record a length of audio at and around the information handling system 100 via a microphone 160-1. This recorded audio of the acoustical background sounds may be held on a sliding audio buffer 176 maintained by the hardware processor 102. This sliding audio buffer 176 may, in an example embodiment, be a continuously updated temporary storage area for this audio of the buffered acoustical background sounds where the oldest data is removed as new audio data is added. This allows the hardware processor 102 to maintain a "window" of audio data that is always moving forward in time. This allows the hardware processor 102 to provide this buffered acoustical background sounds to a voice contextual comparison module 180 when passive voice access attempt is received from a user, after voice recognition of the user in an embodiment by a voice recognition or identification algorithm by the voice contextual comparison algorithm 180. The voice contextual comparison algorithm 180 conducts a spectral comparison of the buffered acoustical background sounds to the background noise detected in the audio recorded of a passive voice access attempt, such as in the space between words spoken in embodiments herein. The hardware processor 102 may also provide this buffered acoustical background sounds to an audio data module 172 for determination of audio inputs into a contextual environment machine learning ML module 174.

While the hardware processor 102 is continuously gathering the acoustical background sounds at the sliding audio buffer 176 and passive voice access attempt is received at a microphone from a user, the hardware processor 102 may execute computer-readable program code instructions of a context gathering module 164 to capture operating conditions data of the information handling system 100 from system sensors and environmental context sensor data for the environment or location where the information handling system 100 is deployed. In an embodiment, a location context data module 168 may gather data related to the location of the information handling system 100. The location data module 168 may use a plurality of sensors to determine the location of the information handling system 100 at any given time. For example, the location context data module 168 may use a global positioning system (GPS) sensor, a RADAR system, an altimeter, and an RSSI sensor and WiFi triangulation sensor. Any or all of these sensors may provide data to the location context data module 168 for the location context data module 168 to accumulate and define a current position of the information handling system 100 for later use as input to the contextual environment machine learning ML module 174 for context of expected background noises or sounds for comparison to the passive voice access attempt to determine a context matching score in embodiments herein. The context matching score relates to a generated confidence score that the environmental and other contexts of the information handling system matches the background noise of the passive voice access attempt.

In an embodiment, and as part of the execution of the computer-readable program code instructions of the context gathering module 164, a received signal strength indicator (RSSI) sensor may be used to determine if a Bluetooth® (BT) device that was previously registered at the information handling system 100 or whether any BT device not previously registered with the information handling system 100 is detected. Where a previously paired and registered BT device is detectable as being present near the information handling system 100, this data may indicate that the attempted access to the information handling system 100 should be granted. However, where a BT device that has not been registered with the information handling system 100 is detected by the RSSI sensor, this additional data may indicate that the attempted access should be suspected.

The hardware processor 102 may also execute computer-readable program code instructions of a video context data module 170. The video context data module 170 may gather video data and other visual information from, for example, a video camera 162 or other imaging device to determine a visual context around the information handling system 100. The video context data module 170 may also use a number of sensors in order to gather this visual context data. For example, these sensors may include the video camera 162, an infrared (IR) camera, a time-of-flight camera, an ultrasound sensor, and an ultraviolet sensor, among others. This data may be gathered and the video context data module 170 may define objects such as people located around the information handling system 100 as well as other visual context data for later use as input to the contextual environment machine learning ML module 174 to generate a context matching score in some embodiments.

The hardware processor 102 may also execute computer-readable program code instructions of an audio context data module 172. The audio context data module 172 may gather further audio information that describes the context in which the information handling system 100 is operating and the environment around the information handling system 100. In an embodiment, the audio context data module 172 may use sensors such as the primary microphone 160-1, plural primary and secondary microphones 160-1, 160-2 or any number of microphones, as well as some software applications such as a mode detection system, voice identification system, current privacy settings and the like to define an audio context in which the information handling system 100 is operating at and within. Further, buffered audio, such as buffered background acoustical audio, may be gathered from a sliding audio buffer 176 in some embodiments. Similar to the location context data module 168 and video context data module 170, the data from the audio context data module 172 may also be used as input to the contextual environment machine learning ML module 174 for processing to generate the context matching score in some embodiments.

In another embodiment, the hardware processor 102 may execute computer-readable program code instructions of an information handling system mode context module 166. The data gathered by the information handling system mode context module 166 may define the mode functions of the information handling system 100 such as lid position (e.g., of a laptop-type information handling system 100), current temperatures within the information handling system 100, processing tasks, running applications, battery characteristics, screen brightness, orientation (e.g., upside down, tablet orientation, easel orientation, etc.) wireless state, among other mode contexts. The information handling system mode context module 166 may use sensors as well which may include, for example, capacitive sensors, hall-effect sensors, thermal sensors, touch sensors, humidity sensors, among others. Again, this information handling system mode context data gathered by the information handling system mode context module 166 may be provided as input to the contextual environment machine learning ML module 174 to generate the context matching score in some embodiments herein.

Once this context gathering module 164 has gathered this data via execution of the information handling system mode context module 166, the location context data module 168, the video context data module 170, and the audio context data module 172, the context gathering module 164 may provide this contextual environment identification landscape data, where available, as input to the contextual environment machine learning ML module 174 to generate the context matching score. This contextual environment identification landscape data defines expected audio features within background noise audio, or even user voice audio data, detected in the passive voice access attempt at the microphone 160-1. For example, where the data indicates, via GPS, that the information handling system 100 is located within a town park, or the wireless interface adapter 134 indicates that the information handling system 100 is accessing a public WiFi connection, or sensing Bluetooth® signatures as belonging to user or strangers, power management unit 128 indicates that battery power is being used, processing resources are indicated as being consumed to provide streaming video at the video/graphics display device 150, the lid is open, a person is sitting in front of the information handling system 100, and GPS data indicates that roads are present close by, the contextual environment machine learning ML module 174 use this contextual environment identification landscape data as expected background noise audio for correlation to any audio of background noise or the user's voice in the passive access attempt at the primary microphone 160-1 by the hardware processor 102 include certain audio features. These audio features may include chirping birds, honking horns, and accelerating engines from vehicles on the road, audio from the streaming output, and the like. As a result, any passive voice access attempt received from a user should include these audio features as expected background noise for a higher context matching score. Buffered acoustical background sounds recorded in a sliding audio buffer 176 may identify characteristic background noises received at the primary microphone 160-1 in spectral analysis of buffered acoustical background sounds in other embodiments and compared spectral features of background noises in the received passive voice access attempt in some embodiments by the voice contextual comparison module 180 for generation of the voice background matching score. In some embodiments the microphone 160-1 may be a beamforming microphone array to determine background noises from a user's voice print in a received passive voice access attempt based on detection of a voice source versus a background. In some embodiments, a received passive voice access attempt may also be recorded by a plural microphones 160-1 and 160-2 for beamforming do determine the user's voice source origination and background noise locations. In some other embodiments the buffered acoustical background sounds may also be recorded by a secondary microphone 160-2.

Thus, as operation of the voice contextual comparison module 180 continues, the voice contextual comparison module 180 may compare the buffered acoustical background sounds recorded in the sliding audio buffer 176 recently from microphone 160-1 or microphones 160-1 and 160-2 to the background noise in the received passive voice access attempt captured by the microphone 160-1 or microphones 160-1 and 160-2 during a passive voice access attempt and generate a voice background matching score by spectral comparison using digital signal processing. The execution of the computer-readable program code instructions of the voice contextual comparison module 180 may also compare the background noise within a passive voice access attempt to expected acoustical background sounds within the contextual environment identification landscape data detected from any of a plurality of context sensors, such as a global positioning system or other sensors, and generate the context matching score via the contextual environment ML module 174. These matching scores may be combined by adding, normalization and averaging, or other methods together by the voice contextual comparison module 180 for comparison to the threshold access authorization confidence score to determine if access to the information handling system 100 should be granted to the user after a passive voice attempt has been received from the microphone 160-1 or 160-2. Thus, if a recorded voice of an authorized user is being used by an unauthorized user to gain access to the information handling system 100, the background sounds captured in the buffered acoustical background sounds and the detected context for expected background sounds would be different from the actual background noise within the recorded user's voice in the passive voice access attempt. For example, a different or additional level of background noise or otherwise altered background noise may be present in the passive voice access attempt but not in the buffered acoustical background sounds or expected based on environmental context of the information handling system. A result of using the recorded voice of an authorized user by an unauthorized user would then result in the threshold access authorization confidence score not being met or exceeded and the voice contextual comparison module 180 may direct that the information handling system 100 be locked, or access limited, so that unauthorized access cannot be obtained. The opposite is true where the passive voice access is attempted by an authorized user which would include background noise with a high degree of matching confidence to the buffered acoustical background noises recently stored as well as high degree of matching confidence to expected background noises from detected environmental context landscape data. In the latter case, access would be granted because the audio picked up by the microphone 160-1 or 160-2 has a high confidence level of being a user's voice provided in situ by the authorized user and not a pre-recorded version of the user's voice instead.

It is appreciated that, during operation when the audio is used during the passive voice access by a user, the context gathering module 164 may use an automatic speech recognition (ASR) module 178. The ASR module 178 may define, within the audio of a received passive voice access attempt, those portions of the audio that contain spoken words and those sections of the audio where background noise would be expected to be picked up. Additionally, the output from the ASR module 178 may be used as input to a natural language processing (NLP) module 177 that interprets a meaning of the speech recognized by the ASR module 178 and enables the information handling system 100 to understand, interpret, and process human language. For example, the NLP module 177 may both recognize voice and words within the passive voice access attempt audio for access request or for passive voice commands during the passive voice access control, if granted, for any passive voice commands used by the user to access features on the information handling system 100. This allows the comparison of acoustical background sounds actually detected in the passive voice access attempt recorded at the microphone 160-1 to buffered acoustical background noise or to those expected acoustical background sounds within the contextual environment identification landscape.

In an embodiment, the information handling system 100 may execute computer-readable program code instructions of a question generation module 182. The question generation module 182 may provide, in an example embodiment, visual questions on a graphical user interface (GUI) presented at the video/graphics display device 150 or audio questions selected from a plurality of potential questions. These questions may be random questions or selected from library of plural questions with expected answers, that may elicit a response by the user who would use the microphone 160 to orally respond to the question presented. In an embodiment, this may be a challenge question that may bar access if a response is wrong. In other embodiments, the oral response, expected answer may be provided with audio of the received passive voice access attempt to the contextual environment ML model 174 in the context gathering module 164 for use by the voice contextual comparison module 180 in generating a context matching score for determining if the user is granted access to the information handling system 100 as described herein. This presents an additional obstacle for an unauthorized user attempting to use a recorded voice of an authorized user in order to gain access to the information handling system 100 during this passive voice access attempt because previous knowledge of the question would be required. In an embodiment, the question generation module 182 may only present a question (e.g., which may consistently change to prevent unauthorized user to go back and rerecord a responsive answer) to the user, selected from a plurality of potential questions, via the video/graphics display device 150 or speaker 186 when, for example, the location context data module 168 of the voice contextual comparison module 180 has detected that a new unknown setting or contextual environment identification landscape data has been detected in an unsecure setting.

In an embodiment, the hardware processor 102 may also include one or more speakers 186 used to present, for example, a subaudible tone during when passive voice access is attempted by a user. This subaudible tone would also be recorded by the microphone 160 and used as input to the context gathering module 164 and the voice contextual comparison module 180. When, for example, an authorized user attempts access to the information handling system 100, the voice and subaudible tone are modulated and used in comparing with recoded sample which may also including both voice and the subaudible tone during registration process. When an unauthorized user secretly records an authorized user's voice when the authorized user is near the information handling system 100, the recording would include the subaudible tone being generated by the information handling system 100. When, in this example, the unauthorized user plays the recorded voice that contains the subaudible tone for access to the information handling system 100, the recorded voice and subaudible tone is again modulated with the information handling system 100 generated subaudible tone during access attempts. This dual subaudible tone modulation of the recorded voice may be detectable thereby pointing to an indication that the voice was prerecorded. In contrast, when an authorized user is speaking in order to gain access to the information handling system 100, the user's voice is modulated with the subaudible tone once. In an embodiment, the subaudible tone may be modulated with a voice sample containing the user's voice and buffered acoustical background sounds. This once modulated voice sample may then be compared to any passive voice access attempt which includes the subaudible tone background noise that will be modulated again in the recording for a twice modulated background tone. This may be distinguished from the once-modulated voice sample containing the tone by the voice contextual comparison module 180 in other embodiments herein.

The systems and methods described herein, therefore, prevent unauthorized access to or control of the information handling system 100 via a recorded voice used in place of a real and authorized user's voice. These systems and methods distinguish a live person's voice from a recorded voice even if the recorded voice is that of the authorized user at a different time. This, therefore, increases the security of the information handling system 100 to prevent unauthorized access to potentially sensitive information stored on the information handling system 100.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
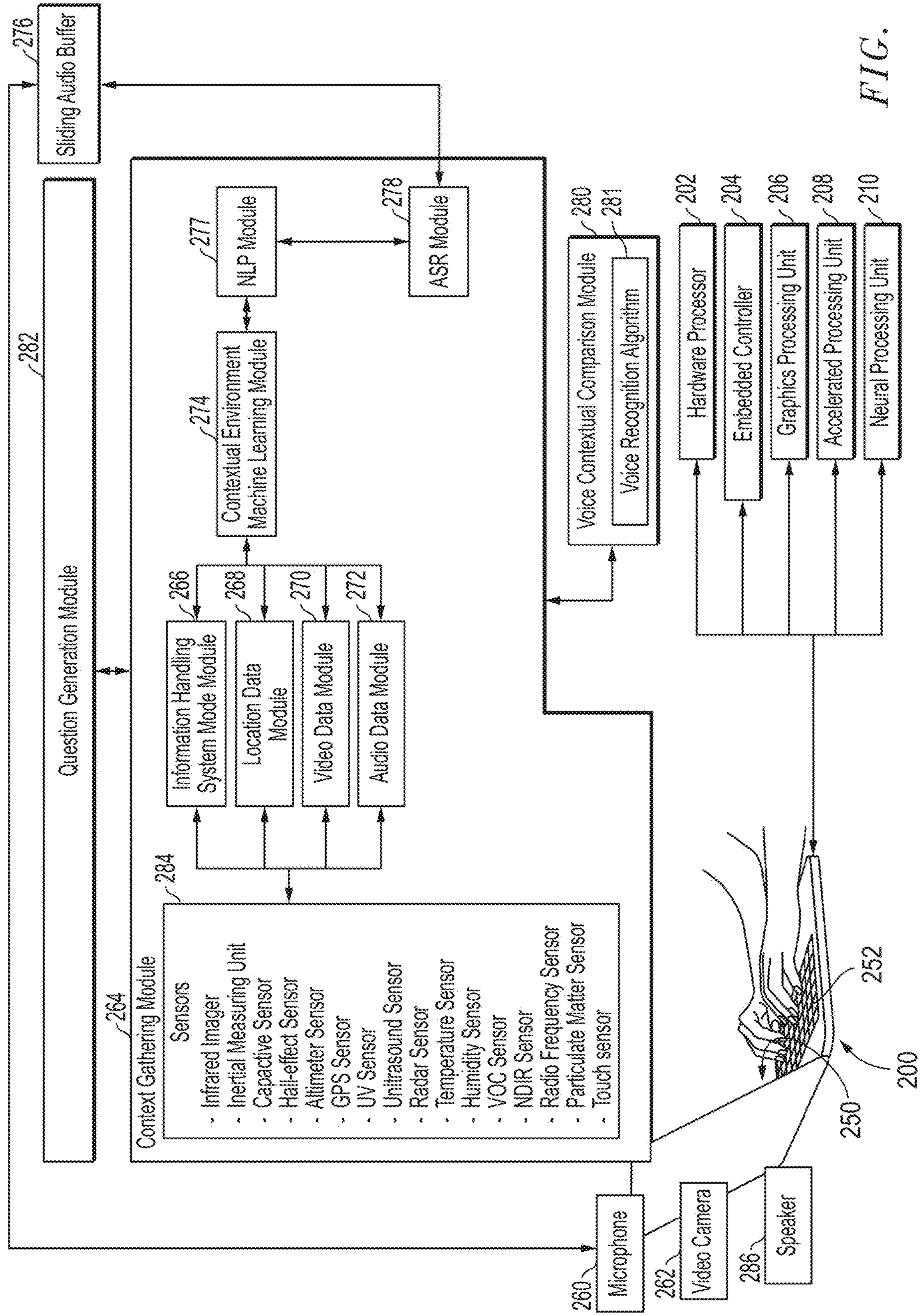
FIG. 2 is a graphic and block illustrating an information handling system that includes computer-readable program code instructions of a context gathering module and voice contextual comparison module to prevent voice access with a recorded voice to the information handling system according to another embodiment of the present disclosure.

FIG. 2 is a graphic and block illustrating an information handling system 200 that includes computer-readable program code instructions of a context gathering module 264 and voice contextual comparison module 280 to prevent voice access with recorded voice to the information handling system 200 according to another embodiment of the present disclosure. FIG. 2 shows the information handling system 200 as a laptop-type information handling system 200 in this example. It is appreciated, therefore, that the information handling system mode context module 266 described herein may detect a current orientation of the information handling system 100 (e.g., lid open as shown and in a display orientation). It is appreciated, however, that the sensors described herein along with the execution of the computer-readable program code instructions of the information handling system mode context module 266 may detect different orientations of the information handling system 100 other than that shown in FIG. 2. For example, the orientations detected may include, but are not limited to, a lid closed orientation, a tablet configuration and orientation, a tent orientation, an easel orientation, and the like such that these orientations may be used as input data to the voice contextual comparison module 280 as described herein.

Again, during operation and after the information handling system 200 has been powered on or otherwise initialized, the hardware processor 202 of the information handling system 200 may cause that acoustical background sounds to be captured at the microphone 260 of the information handling system 200. These acoustical background sounds may include sounds that could be expected in a specific location where the information handling system 200 is present. For example, if the information handling system 200 was brought to a café, the acoustical background sounds may record sounds of a number of people within the café and other sounds that would be expected to be picked up by the microphone 260 in such a situation. Conversely, if the information handling system 200 was brought to an office building, other sounds such as typing, printers printing, and conversations may also be expected within the recorded acoustical background sounds. It is also appreciated that, as described herein, one or more speakers 286 may emit an audible or subaudible sound that would also be captured at the microphone 260 during any of the processes described herein.

In an embodiment, the hardware processor 202 may continuously record a length of audio at and around the information handling system 200. This recorded audio of the acoustical background sounds may be held on a sliding audio buffer 276 maintained by the hardware processor 202. This sliding audio buffer 276 may, in an example embodiment, be a continuously updated temporary storage area for this audio of the acoustical background sounds where the oldest data is removed as new audio data is added. This sliding audio buffer 276 may operate as a first-in, first-out buffer such that old audio is deleted while new audio is saved at the sliding audio buffer 276. This allows the hardware processor 202 to maintain a window of audio data that is always moving forward in time. The buffered background acoustical sounds may be buffered for a duration of seconds or minutes in various example embodiments. For example, the sliding audio buffer 276 may buffer background acoustical sounds for 30 second windows in one example embodiment. This also allows the hardware processor 202 to provide, at any moment, recently buffered acoustical background sounds for a time immediately prior to when passive voice access is attempted by a user whether authorized or unauthorized for spectral comparison at the voice contextual comparison module to a received passive voice access attempt or to the contextual environment machine learning ML module 274 for contextual matching score analysis. In an embodiment, the hardware processor 202 is continuously gathering and buffering the acoustical background sounds at the sliding audio buffer 276.

Upon a passive voice access attempt received for a purported user, the hardware processor 202 may execute computer-readable program code instructions of a context gathering module 264 to capture operating conditions of the information handling system 200 from system data sensors and environmental context data sensors for the environment where the information handling system 200 is deployed. This may be done via operation of one or more sensors 284 providing data to each of the information handling system mode context module 266, the location context data module 268, the video context data module 270, and the audio context data module 272 as described herein. It is appreciated that the number of sensors 284 may include any type of sensor that may inform the context gathering module 264 of current environmental and operational context of the information handling system 200. Although FIG. 2 shows a listing of sensors 284, the list presented is merely example sensors 284 that may be used, and the present specification contemplates the use of other sensors to gather this environmental context data and information handling system operational context data. Examples of these sensors 284 may include an infrared (IR) imager, an inertial measuring unit, a capacitive sensor, a hall-effect sensor, a time-of-flight (ToF) sensor, an altimeter sensor, a GPS sensor, an ultraviolet (UV) or other light sensor, an ultrasound sensor, a RADAR sensor, a temperature sensor, a humidity sensor, a volatile organic compound (VOC) sensor, a nondispersive IR (NDIR) sensor, a radio frequency (RF) sensor, an ultra-wideband (UWB) sensor, a particulate matter sensor, and a touch sensor. Further, the wireless interface adapter, such as described in FIG. 1, the video camera 262, the microphone 260, and determination of operations at any hardware processor 202, 204, 206, 208 or 210 may be further sensors for operational context or environmental sensing for the information handling system. Each of these sensors 284 and others described here may be used to provide data to one or more of the information handling system mode context module 266, the location context data module 268, the video context data module 270, and the audio context data module 272 as described herein.

In an embodiment, the location context data module 268 may gather data related to the location of the information handling system 200 and context thereof. The location data module 268 may use a plurality of sensors to determine the location of the information handling system 200 at any given time. For example, the location context data module 268 may use a GPS sensor, a RADAR system, an altimeter, and an RSSI sensor and WiFi triangulation sensor. Any or all of these sensors may provide data to the location context data module 268 for the location context data module 268 to accumulate and define a current position of the information handling system 200 for later use as input to the contextual environment machine learning ML module 274 for determination of a context matching score relative to a received passive voice access attempt. In an embodiment, and as part of the execution of the computer-readable program code instructions of the context gathering module 264, a received signal strength indicator (RSSI) sensor may be used to determine if a Bluetooth® (BT) device that was previously registered at the information handling system 200 or whether any BT device not previously registered with the information handling system 200 is detected. Where a previously paired and registered BT device is detectable as being present near the information handling system 200, this data may indicate that the attempted access to the information handling system 200 should be granted. However, where a BT device that has not been registered with the information handling system 200 is detected by the RSSI sensor, this additional data may indicate that the attempted access should be suspected.

The hardware processor 202 may also execute computer-readable program code instructions of the video context data module 270. The video context data module 270 may gather video data and other visual information from, for example, a video camera 262 or other imaging device to determine a visual context around the information handling system 200. The video context data module 270 may also use a number of sensors in order to gather this visual context data. For example, these sensors may include the video camera 262, an IR camera, a ToF camera, an ultrasound sensor, and an UV sensor, among others. This data may be gathered and the video context data module 270 may define objects such as people located around the information handling system 200 as well as other visual context data for later use as input to the contextual environment machine learning ML module 274 for determination of the context matching score relative to a received passive voice access attempt.

The hardware processor 202 may also execute computer-readable program code instructions of the audio context data module 272. The audio context data module 272 may gather further audio information that describes the context in which the information handling system 200 is operating and the environment around the information handling system 200. In an embodiment, the audio context data module 272 may use sensors such as the microphone 260 as well as some software applications such as a mode detection system, voice identification system (e.g., accessing authorized user voice patterns), current privacy settings and the like to define an audio context in which the information handling system 200 is operating at and within. Similar to the location context data module 268 and video context data module 270, the data from the audio context data module 272 may also be used as input to the contextual environment machine learning ML module 274 for determination of the context matching score relative to a received passive voice access attempt.

In another embodiment, the hardware processor 202 may execute computer-readable program code instructions of an information handling system mode context module 266. The data gathered by the information handling system mode context module 266 may define the mode functions of the information handling system 200 such as lid position (e.g., of a laptop-type information handling system 200), current temperatures within the information handling system 200, processing tasks, running applications, battery characteristics, screen brightness, orientation (e.g., upside down, tablet orientation, easel orientation, etc.) wireless state, among other mode contexts. The information handling system mode context module 266 may use sensors as well which may include, for example, capacitive sensors, hall-effect sensors, thermal sensors, touch sensors, humidity sensors, among others. Again, this information handling system mode context data gathered by the information handling system mode context module 266 may be provided as input to the contextual environment machine learning ML module 274 for determination of the context matching score relative to a received passive voice access attempt.

Once this context gathering module 264 has gathered this data via execution of the information handling system mode context module 266, the location context data module 268, the video context data module 270, and the audio context data module 272, the context gathering module 264 may provide this contextual environment identification landscape data as input to the contextual environment machine learning ML module 274 along with a received passive voice access attempt. This is done to generate a confidence score that the operational and environmental context of the information handling system from the gathered contextual environment identification landscape data corresponds to the received passive voice access attempt, such as detected background noise features, location context, identification of a location for a user, configuration or usage of the information handling system, or the like. In one example, this gathered contextual environment identification landscape data defines expected audio features within audio of a passive voice access attempt detected at the microphone 260. For example, where the contextual environment identification landscape data indicates, via GPS, that the information handling system 200 is located within a town park oriented by a lake, the information handling system 200 is accessing a public WiFi connection, battery power is being used, processing resources are consumed to provide streaming video at the video/graphics display device 250, the lid is open, a person is sitting in front of the information handling system 200, and GPS data indicates that roads are present close by, the contextual environment machine learning ML module 274 may provide output that indicates that any audio gathered at the microphone 260 by the hardware processor 202 (or other hardware processing device such as a NPU 210, a APU 208, EC 204, GPU 206, etc.) of the passive voice access attempt should include certain background noise audio features or even voice print audio features. These background noise audio features may include chirping birds, honking horns, lapping water, accelerating engines from vehicles on the road, and audio from the streaming output, and the like in example embodiments. As a result, any passive voice access attempt that is received should include these audio features as expected background noise as determined by execution of the contextual environment ML model 274 in determining a context matching score. Without these expected background noises in the audio captured during a passive voice access by a user, the context environment ML module 274 may provide a lower context matching score that would result from low confidence scoring that the audio of the passive voice access attempt is that of a live user's voice in situ rather than a recorded version of the user's voice used for the passive voice access.

In an embodiment, the voice portions of the recorded audio of the user in a received passive voice access attempt at microphone 260 may be compared to stored and authorized voice patterns of the authorized user execution of a voice recognition algorithm 281 directed to speaker recognition. Example speaker recognition algorithms that may be used with voice recognition algorithm 281 may include execution of computer readable program code executing frequency estimation algorithms, hidden Markov model algorithms, Gaussian mixture algorithms, pattern matching algorithms, neural network algorithms, decision tree algorithms, or cosine similarity algorithms among others for comparing the received passive voice access attempt to a voice print sample of an authorized user's voice. This is done by the voice contextual comparison module 280 as an initial matter to confirm a detected voice in a passive voice access attempt is a voice of an authorized user. If the voice of the received passive voice access attempt is not recognized as the authorized user, then the voice contextual comparison module 280 denies access to the information handling system and may perform security measures to lock down the information handling system. If the voice of the received passive voice access attempt is recognized as that of the authorized user is not Thus, as the operation of the voice contextual comparison module 280 continues, a voice contextual comparison module 280 may compare the acoustical background sounds to background noise within an audio recording of the passive voice access attempt of the user captured by the microphone. The execution of the computer-readable program code instructions of the voice contextual comparison module 280 may also spectrally compare the background noise portions of the passive voice access attempt to buffered acoustical background sounds recently stored in the sliding audio buffer 276 to generate a voice background matching score according to embodiments as described herein. It is appreciated that determination of the voice matching score may be influenced certain features, such as characteristic background features in buffered background acoustical sounds, that must correlate in the background noise of the received audio of the passive voice access. Further, the voice contextual comparison module 280 may be influenced by a context matching score in embodiments herein from comparison of the passive voice access attempt to expected acoustical background sounds within the contextual environment identification landscape data from expected features per the input from the location context data module 268, information handling system mode context module 266, video context data module 270, and audio context data module 272 in the contextual environment ML module 274 to generate the context matching score.

It is appreciated that the context environment ML module 274 may include any type of machine learning technology that may learn from the various types of data received and generalize unseen data and performing tasks without explicit instructions. Thus, the context environment ML module 274 may incorporate any large-language models, supervised learning modules, unsupervised learning modules, semi-supervised learning modules, reinforcement leaning modules, deep learning modules and the like. It is also appreciated that the computer-readable program code instructions of the context environment ML module 274 may be executed by those hardware processing devices that are better equipped to handle such processes such as a NPU 210. It is also appreciated that those processing tasks associated with the execution of the computer-readable program code instructions of the context environment ML module 274 may be shared among the various hardware processing resources 202, 204, 206, 208, 210 within the information handling system 200.

Those calculated context matching scores and voice background matching scores may be combined, via adding, normalization, normalized averaging, weighted normalized averaging or other methods by the voice contextual comparison module 280 for comparison to a threshold access authorization confidence score to determine if access to the information handling system 200 should be granted to the user. Thus, if a recorded voice of an authorized user is being used by an unauthorized user to gain access to the information handling system 200, the recently buffered background acoustical sounds would be different and not match or otherwise correlate with high confidence yielding a lower voice background matching score. Similarly, the detected context and expected environmental background sounds from contextual environment identification landscape data input into a contextual environment ML module 274 would be different from the actual background noise within the recorded user's voice used in a passive voice access attempt yielding a lower confidence context matching score. A result of using the recorded voice of an authorized user by an unauthorized user would then result in the threshold access authorization confidence score to not be met or exceeded and the voice contextual comparison module 280 may direct that the information handling system 200 be locked so that unauthorized access cannot be obtained. The opposite is true where the passive voice access is attempted by an authorized user such that a high confidence match for voice background matching score and context matching score would meet the threshold access authorization confidence score requirement the audio picked up by the microphone 260 would not have been pre-recorded and instead provided in situ by the authorized user before access would be granted.

It is appreciated that, during operation when the audio used during the passive voice access by a user, the context gathering module 264 may use an automatic speech recognition (ASR) module 278 and NLP module 277. The ASR module 278 may use code instructions executing hidden Markov model algorithms in a trained neural network or may execute deep learning recurrent neural networks to identify speech within an audio sample. A variety of ASR model algorithms are contemplated in embodiments herein. The ASR module 278 may define within the audio those portions of the audio that contain spoken words and those sections of the audio where background noise would be expected to be picked up such as in troughs or gaps between spoken words in a spectral output of a passive voice access attempt. This allows the comparison of delineated background noises actually detected in a passive voice access attempt to buffered acoustical background sounds by the voice contextual comparison module 280 for a voice background matching score. Further, comparison of delineated background noises detected in a passive voice access attempt may be made to those expected acoustical background sounds within the contextual environment identification landscape data input into the contextual environment ML module 174 when determining a context matching score in embodiments.

In an embodiment, the information handling system 200 may execute computer-readable program code instructions of a question generation module 282. The question generation module 282 may provide, in an example embodiment, visual questions on a graphical user interface (GUI) presented at the video/graphics display device 250. These questions may be random questions and made to rarely repeat that may elicit a response by the user who would use the microphone 260 to orally respond to the question presented. As such, this audio response may be captured by the microphone 260 and passed to the context gathering module 264 via, for example, the sliding audio buffer 276 for use in determining if the user is granted access to the information handling system 200 as described herein. This may result in presenting an additional obstacle for an unauthorized user attempting to use the recorded voice of an authorized user in order to gain access to the information handling system 200 during this passive voice access attempt. In an embodiment, the question generation module 282 may only present a question to the user via the video/graphics display device 250 when, for example, the location context data module 268 of the voice contextual comparison module 280 has detected that a new setting or contextual environment identification landscape has been detected.

Figure 3:
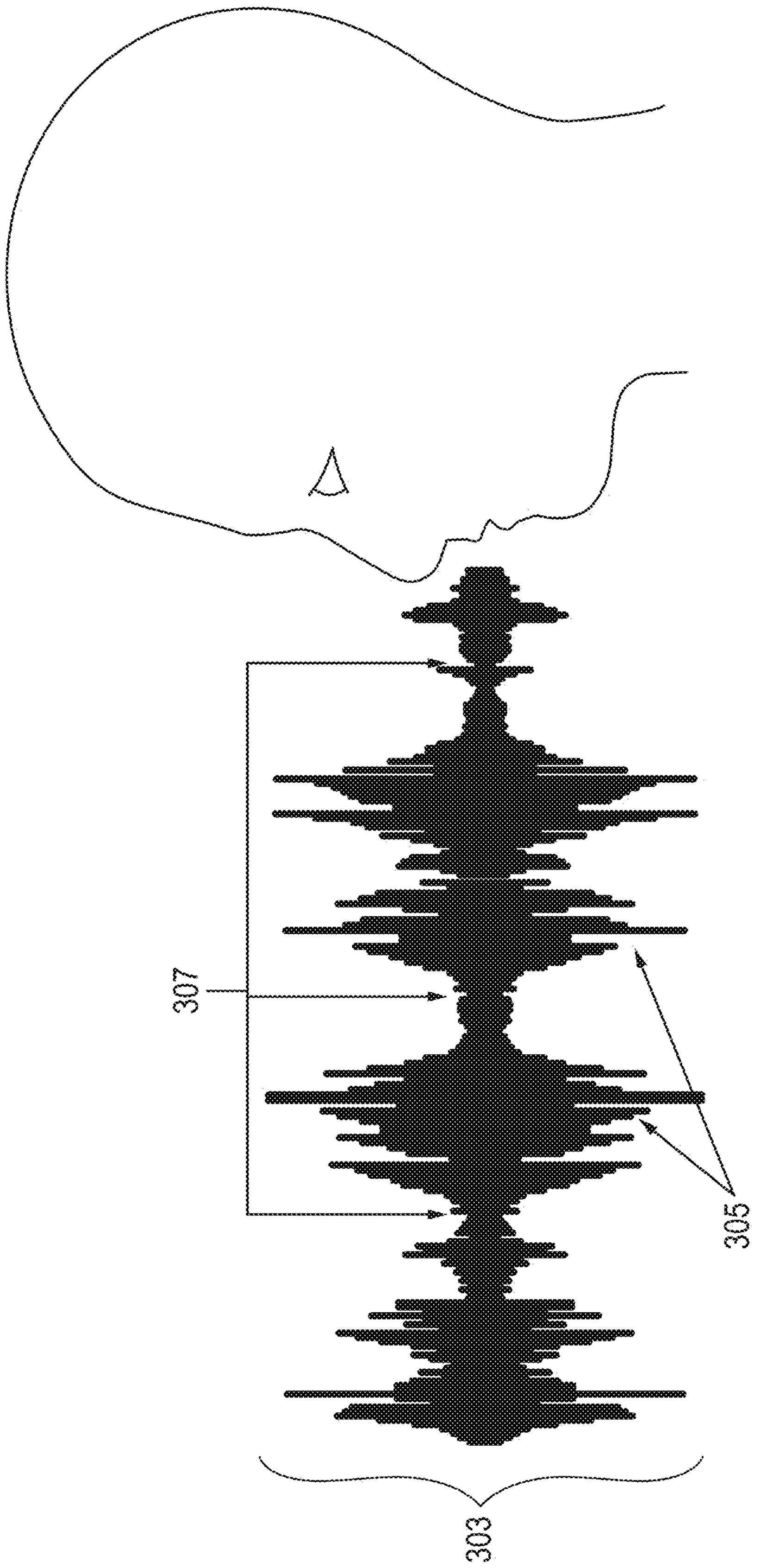
FIG. 3 is a graphic diagram illustrating a voice pattern with audio background present in a recorded audio according to an embodiment of the present specification.

In an embodiment, the hardware processor 102 may also include one or more speakers 186 used to present, for example, a subaudible tone during when passive voice access is attempted by a user. This subaudible tone would also be recorded by the microphone 160 and used as input to the context gathering module 164 and the voice contextual comparison module 180. When, for example, an authorized user attempts access to the information handling system 100, the voice and subaudible tone are modulated and used in comparing with a recoded sample which may also including both voice and the subaudible tone during registration process. When an unauthorized user secretly records an authorized user's voice when the authorized user is near the information handling system 100, the recording would include the subaudible tone being generated by the information handling system 100. When, in this example, the unauthorized user plays the recorded voice that contains the subaudible tone for access to the information handling system 100, the recorded voice and subaudible tone is again modulated with the information handling system 100 generated subaudible tone during access attempts. This dual subaudible tone modulation of the recorded voice may be detectable thereby pointing to an indication that the voice was prerecorded. In contrast, when an authorized user is speaking in order to gain access to the information handling system 100, the user's voice is modulated with the subaudible tone once. In an embodiment, the subaudible tone may be modulated with a voice sample containing the user's voice and buffered acoustical background sounds. This once modulated voice sample may then be compared to any passive voice access attempt which includes the subaudible tone background noise that will be modulated again in the recording for a twice modulated background tone. This may be distinguished from the once-modulated voice sample containing the tone by the voice contextual comparison module 180 in other embodiments herein FIG. 3 is a graphic diagram illustrating a voice pattern of a passive voice access attempt with voice sections and background noise audio portions present in the recorded audio from a microphone according to an embodiment of the present specification. As described herein, a microphone may be used to capture a user's voice. The graphic diagram in FIG. 3 illustrates a spectral voice pattern 303 with voice sections 305 corresponding to spoken words such as in a passive voice access attempt received at an information handling system in embodiments of the present disclosure. The spectral voice pattern 303 further includes background noise audio portions 307 at troughs present in the recorded audio during a passive voice access attempt described herein according to embodiments herein. The voice pattern 303 may be an unauthorized user's voice, a live authorized user's voice, or a recorded version of an authorized user in various embodiments herein. Embodiments of the present disclosure contemplate execution of voice recognition or voice identification algorithms by the voice contextual comparison module at the information handling system to assess pitch, cadence, speed, terms used and other factors in distinguishing between an unauthorized user's voice and an authorized user's voice The present system and method described herein may be used to further distinguish between real authorized user's voice and a recorded version of an authorized user based on comparison to buffered background acoustical sounds captured with recency before a passive voice access attempt and contextual sensor data an information relating to matching the detected background noise audio portions 307 captured in a passive voice access attempt in various embodiments herein. Additionally, as described herein, the hardware processor may execute program code of an ASR module to delineate between the voice sections 305 and background noise audio portions 307 of the voice pattern 303 so that background noises may be separately identified within the voice pattern 303 and compared recent buffered background acoustical sounds or to expected background noises as identified by execution of the context environment ML module.

Figure 4:
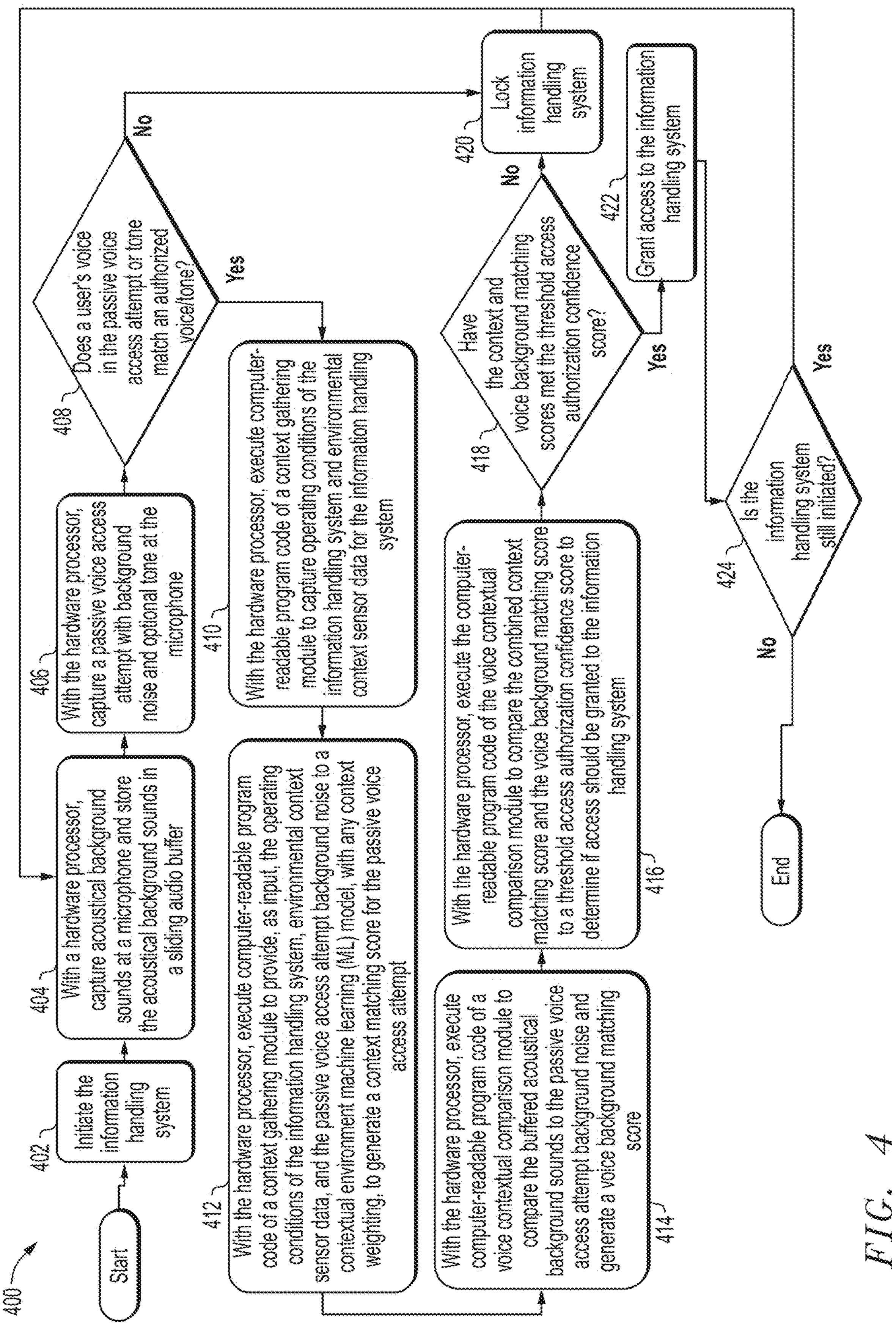
FIG. 4 is a flow diagram showing a method of executing computer-readable program code instructions of a context gathering module and voice contextual comparison module to prevent voice access with a recorded voice to the information handling system according to an embodiment of the present disclosure.

FIG. 4 is a flow diagram showing a method 400 of executing computer-readable program code instructions of a context gathering module and a voice contextual comparison module to prevent passive voice access to an information handling system with a recorded user's voice according to an embodiment of the present disclosure.

At block 402, the information handling system may be initiated. This may include a user actuating a button that causes the PMU of the information handling system to provide power to the hardware processor and other hardware components of the information handling system.

At block 404, the method 400 may include capturing acoustical background sounds at a microphone and buffering the acoustical background sounds from around the information handling system on a sliding audio buffer. In an embodiment, the hardware processor may operate a sliding audio buffer memory such that a temporally moving window of audio is continuously recorded and stored as described herein for use in comparison to a passive voice access attempt to access or control the information handling system. In one embodiment, the sliding window may record and buffer acoustical background sounds for a 15 second time interval. It is contemplated that any buffering window of buffered acoustical background sounds may be saved on the sliding audio buffer memory in various embodiments.

In another embodiment, a voice sample may be captured of the authorized user and stored in memory. A tone may be played on a speaker and captured and modulated with the voice sample and background noise of the authorized user as a once-modulated voice sample with background audio tone. This voice sample with once modulated audio tone may be captured during a previous session of passive voice access and control by an authorized user in an embodiment. In some embodiments herein, the tone played may be a subaudible tone that is still captured by the microphone. In further embodiments, the tone may be played on the speaker whenever the hardware processor detects a voice input at the microphone.

At block 406, the microphone at the information handling system captures a passive voice access attempt of a user voice at the microphone attempting to access or control the information handling system. The passive voice access attempt includes spoken words as well as capture of background noise between the spoken words. Further, in an embodiment, the hardware processor may execute computer readable program code of an ASR module to recognize and delineate words spoken by the user in the passive voice access attempt and background noise therewithin.

In another embodiment, passive voice access attempt includes speech that causes the tone, such as a sub-audible tone, to be played on the speaker. This tone is also captured in the background noise and modulated with the user's voice and background noise of an authentic passive voice access attempt. If a recorded user's voice is used as the passive voice access attempt, it may not include any background tone in an embodiment. In another embodiment, if a recorded user's voice having the played tone in the background is used as the passive voice access attempt, it will include a twice modulated background tone that is distinguishable from an authentic passive voice access attempt that may include only a once-modulated background tone in an embodiment voice sample of the authorized user as a once-modulated voice sample with background audio tone.

Again, in some embodiments the tone played may be a sub-audible tone that is still captured by the microphone.

At block 408, the hardware processor of the information handling system may execute computer-readable program code of a voice contextual comparison module to execute a voice recognition algorithm to compare the received passive voice access attempt with an authentic voice sample of an authorized user of the information handling system. For example, the hardware processor may execute a biometric voice recognition algorithm such as execution of simple nearest neighbor algorithms, hidden Markov models, Gaussian mixture model algorithms, a trained recursive neural networks, pattern matching algorithms and others to analysis of tone, cadence, pace, phrasing, and other factors of detected speech of a passive voice access attempt as compared to one or more voice samples of an authorized user stored at the information handling system.

In another embodiment, the hardware processor of the information handling system may execute computer-readable program code of a voice contextual comparison module compares and determines if a played background tone is present within the received passive voice access attempt or if the received passive voice access attempt includes a double modulation of the background tone indicating that the received passive voice access attempt may be a recorded voice.

If at block 408, the voice contextual comparison module determines that the user's voice in the received passive voice access attempt does not match the authentic user's voice via the voice recognition algorithm, then the method proceeds to block 420 to deny access to the user and lock the information handling system in an embodiment. In another embodiment, if at block 408 the contextual comparison module determines that the background played tones do not match in the received passive voice access attempt, then the method also proceeds to block 420 to deny access to the user and lock the information handling system.

If at block 408, the voice contextual comparison module determines that the user's voice in the received passive voice access attempt does match the authentic user's voice via the voice recognition algorithm, then the method proceeds to block 410 to determine if the user's voice is a recorded voice in the passive voice access attempt in embodiments herein. In further embodiments, if at block 408 the contextual comparison module determines that the background played tones do match in the received passive voice access attempt, then the method also proceeds to block 410 to determine if the user's voice is a recorded voice in the passive voice access attempt.

The method 400 also includes, at block 410, the hardware processor executing computer-readable program code instructions of a context gathering module to capture operating conditions of the information handling system and environmental context where the information handling system is deployed within. As described herein, this includes the context gathering module receiving data from one or more sensors at one or more of the information handling system mode context module, the location context data module, the video context data module, and the audio context data module. It is appreciated that a variety of types of data may be received via these sensors which may include environmental sensors of the environment around the information handling system as well as system sensors for operation or configuration of the information handling system. In one example embodiment, a location sensor, such as a GPS sensor or other location technology, may identify a location of the information handling system. For example, the information handling system may be at a park, at a café, in an office, on a train, moving, stationary, in a bag or suitcase, with the lid open or closed, or in any orientation.

The environmental context and operating conditions of the information handling system may be captured by use of each of these sensors with obtained data being used to define a contextual environment identification landscape of factors for input into a context environment ML module to compare to the received passive voice access attempt to determine a context matching score. In one example embodiment, a location sensor, such as a GPS sensor or other location technology, may identify a location of the information handling system with respect to noises expected in the vicinity as well as determination of whether a location is a known, secure location or an unknown, unsecure location. In other example embodiments, a wireless interface adapter may determine whether a public wireless network (such as public WiFi) or a secure private network is wirelessly coupled. In other embodiments, the hardware processor may execute the computer-readable program code of an audio data module to determine characteristic sounds from the buffered acoustical background expected to be in the background noise of the received passive voice access attempt as well as input into the context environment ML module to compare to the received passive voice access attempt to determine a context matching score for the background context of the passive voice access attempt. Further sensors may include a camera image from a video data module as well as various system sensors to detect orientation, light levels, configuration (e.g., lid open or lid closed), or operation of hardware component systems (e.g., playing streaming video or executing other software applications) as input into the context environment ML module to compare to the received passive voice access attempt to determine a context matching score.

At block 412, the method 400 includes the hardware processor executing the computer-readable program code of the context gathering module to provide, as input, the operating conditions of the information handling system and environmental context sensor data for the information handling system into a contextual environment ML model with the background noise of the received passive voice access attempt to generate a context matching score reflecting confidence level that the background noises reflect the environment identification landscape of the operating conditions and the environmental context sensor data for the information handling system. It is appreciated that the context environment ML module may include any type of machine learning technology that may learn from the various types of data received from the information handling system mode context module, the location context data module, the video context data module, and the audio context data module and correlate that to expected background noises for a correlation score such that the context matching score is generated. In some embodiments, the correlation of the received passive voice access attempt to the operating conditions or environmental context sensor data that there is low confidence that the background noise in the received passive voice access attempt matches suggesting denial of access. In other embodiments, the correlation may be good between the received passive voice access attempt and the operating conditions or environmental context sensor data of the information handling system such that chances improve towards grant of access. In yet other embodiments, the confidence level may be inconclusive.

Further, environmental sensor data may be used for weighting during processing input in the context environment ML module to compare to the received passive voice access attempt to determine the context matching score for the passive voice access attempt. For example, location sensor data such as GPS data, may be used to determine that the information handling system is located in a known, secure location such as a home or office with a lower chance of unauthorized user access attempts. With such location sensor data, for example, a weighting factor may be applied to bias determination of the context matching score by the context environment ML module to increase confidence that the correlation between the received passive voice access attempt is an authentic user's voice and not a recorded voice in some embodiments based on background noise and environmental context for a higher context matching score. Other examples of weighting are contemplated, such as environmental sensor data indicating that the information handling system is in an unknown or unsecure location decreasing confidence for a low context matching score.

At block 414, the hardware processor executes the computer-readable program code of the voice contextual comparison module to compare the buffered acoustical background sounds with the background noise of the passive voice access attempt to generate a voice background matching score. In an embodiment, the voice contextual comparison module conducts a spectral analysis of the noise signature of the buffered acoustical background sounds recorded and saved in the sliding audio buffer with relative recency, such as within the previous several seconds or minutes before a received passive voice access attempt in an embodiment. This spectral noise signature is matched with the background noise in the received passive voice access attempt. For example, in an embodiment, execution of an ASR module may determine speech and non-speech parts of a received passive voice access attempt to delineate the non-speech background noise parts. In other embodiments, comparison of spectral signatures may be made between the buffered acoustical background sounds and the combined voice and background noise portions of the passive voice access attempt for comparison of the background noise component. A difference in this spectral signature will yield to a low correlation and a lowered voice background matching score in an embodiment. For example, a recorded user's voice may have been recorded at a different time such as during a background noise level that is a louder or quieter environment than the buffered acoustical background sounds stored at the sliding audio buffer. Thus, this will yield a mismatch in spectral signature.

In another embodiment, a recording of a user's voice may be done surreptitiously, such as in a pocket or under some papers resulting in a muffled user's voice or different background noises in the passive voice access attempt than the buffered acoustical background sounds stored at the sliding audio buffer. This again may yield a mismatch in spectral signature and a low voice background matching score.

In another embodiment, identifiable noises in the buffered acoustical background may have a particular spectral signature that may be compared for in the received passive voice access attempt by the voice contextual comparison module. For example, birds, car noises, sounds of an air conditioning system, or other environmental noise may provide a particular spectral signature in the buffered background acoustical sounds that may be compared to the received passive voice access attempt and background noise. This again may yield a mismatch in spectral signature and a low voice background matching score in some embodiments.

In another embodiment, microphone beamforming of incoming sound for the captured passive voice access attempt from one beamforming microphone or plural microphones may be conducted with the digital signal processing by the voice contextual comparison module to determine a voice origination location and scan the sound signature away to obtain background noise in the passive voice access attempt. This may further provide the voice contextual comparison module background noise and spectral signature in the passive voice access attempt for comparison to a spectral signature of the buffered acoustical background sounds stored at the sliding audio buffer. This again may yield a mismatch in spectral signature and a low voice background matching score in some embodiments.

At block 416, the hardware processor may execute the computer-readable program code of the voice contextual comparison module to compare the combined context matching score and voice background matching score to a threshold access authorization confidence score to determine if access should be granted to the information handling system. As described herein, the output from the context environment ML module is used to influence the overall confidence score of authenticity of the passive voice access attempt such that a low score may result in the user not being granted access to the information handling system and the information handling system being locked. The threshold access authorization confidence score may be set such that combined context and voice background matching scores prevents access due to the invalidity of the passive voice access attempt either not matching well with a buffered acoustical background sample saved with recency in the sliding audio buffer, not matching well with operating conditions or contextual environmental sensor data for the information handling system, or both. A high combined context and voice background matching score may result in the user being granted access to and control of the information handling system. The threshold access authorization confidence score may be set such that combined context and voice background matching scores provides access when the passive voice access attempt matches well with a buffered acoustical background sample saved with recency in the sliding audio buffer, matches well with operating conditions or contextual environmental sensor data for the information handling system, or both.

Turning to block 418, when the combined context matching score and voice background matching score do not reach a threshold access authorization confidence score such that the passive voice access attempt is likely to be a recorded user's voice from an unauthorized user, the method proceeds to block 420. When the combined context matching score and voice background matching score do meet a threshold access authorization confidence score such that the passive voice access attempt is likely to be the authentic user's voice and not recorded, the method proceeds to block 422. Thus, at block 418, the hardware processor may determine if the context matching score and voice background matching score meets or exceeds the threshold access authorization confidence score that the passive voice access attempt is authentic and not recorded.

Where the context matching score and voice background matching score does not meet or exceed the threshold access authorization confidence score, the method 400 continues to block 420 with the hardware processor locking the information handling system. At block 420, the passive voice access attempt and user are denied access to the information handling system. When the information handling system is locked, the hardware processor may cause the information handling system to enter a secure state where access to its desktop, applications, and files is restricted until a valid authentication method is provided. In those example embodiments presented herein, this valid authentication method may include, at block 404, the authorized user once again providing passive voice access audio and the background audio being captured by the microphone that is determined to be authentic. Manual entry of passwords or other security measures may be required.

Where the context matching score and voice background matching score does meet or exceed the threshold access authorization confidence score, the method 400 continues to block 422. At block 422, access is granted to the user to operate the information handling system. The systems and methods described herein, therefore, prevent unauthorized access to the information handling system via a recorded voice used in place of a real and authorized user. These systems and methods distinguish a live person's voice from a recorded voice even if the recorded voice is that of the authorized user. This, therefore, increases the security of the information handling system thereby preventing unauthorized access to potentially sensitive information stored on the information handling system.

The method 400 may continue to block 424 to determine if the information handling system is still initiated. Where the information handling system is still initiated, the method 400 proceeds to block 404 to monitor acoustic background sounds and for later passive voice access attempts if a period of inactivity has expired later passive voice access attempts if a period of inactivity has expired. Then the method 400 may proceed according to embodiments described herein. Where the information handling system is no longer initiated, the method 400 may end.

Figure 5:
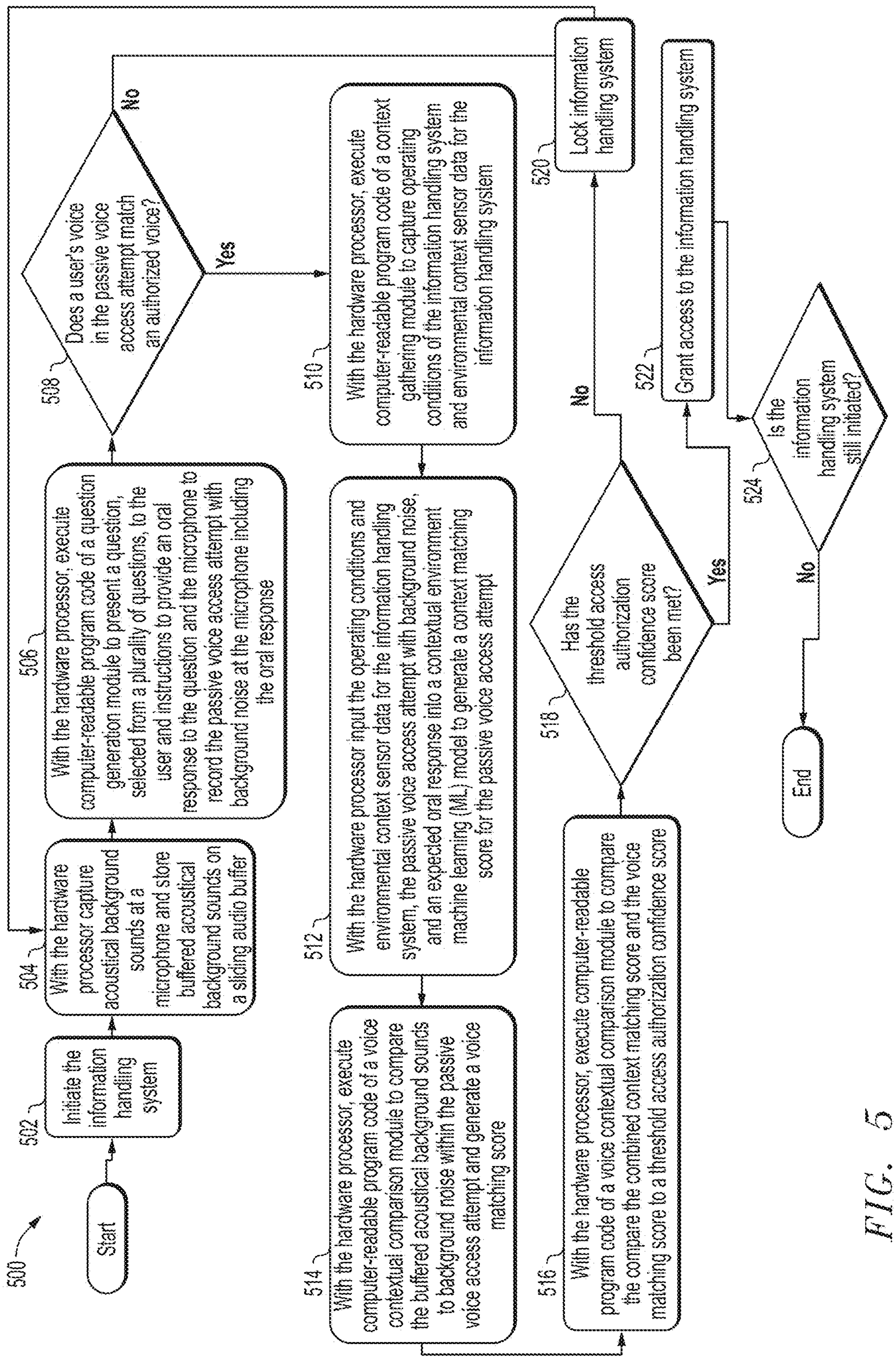
FIG. 5 is a flow diagram showing a method of executing computer-readable program code instructions of a context gathering module and voice contextual comparison module to prevent voice access with a recorded voice to the information handling system according to another embodiment of the present disclosure.

FIG. 5 is a flow diagram showing a method 500 of executing computer-readable program code instructions of a context gathering module and voice contextual comparison module to prevent passive voice access to the information handling system with a recorded user's voice according to an embodiment of the present disclosure. The method 500 described in connection with FIG. 5 may include similar processes as described in connection with FIG. 4. Unlike FIG. 4, however, the present method 500 described in FIG. 5 includes the use of a question generation module.

At block 502, the information handling system may be initiated. This may include a user actuating a button that causes the PMU of the information handling system to provide power to the hardware processor and other hardware devices of the information handling system.

At block 504, the method 500 may include capturing acoustical background sounds at a microphone and buffering the acoustical background sounds from around the information handling system on a sliding audio buffer. In an embodiment, the hardware processor may operate a sliding audio buffer memory such that a temporally moving window of audio is continuously recorded and stored as described herein for use in comparison to a passive voice access attempt to access or control the information handling system. In one embodiment, the sliding window may record and buffer acoustical background sounds for a 15 second time interval. It is contemplated that any buffering window of buffered acoustical background sounds may be saved on the sliding audio buffer memory in various embodiments.

At block 506, the method 500 includes executing computer-readable program code of a question generation module to present a question, selected from a plurality of question or generating a random question, to a user when triggered by a passive voice access attempt detected at a microphone. In an example embodiment, the question may be provided on a display device in a GUI that includes the selected question presented to the user. This GUI may include instructions directing a user to provide an oral response to the question. In another embodiment, the question may be selected and played over a speaker with an instruction to provide an oral response to the question. The microphone of the information handling system may record the passive voice access attempt with the oral response to the question.

The question generation module may provide, in an example embodiment, a question selected from a plurality of questions such as from a library of questions and expected answers. In other embodiments, a voice generator may use artificial intelligence to generate a question that is a random question and having an expected answer. This may elicit an oral response by the user who would use the microphone to orally respond to the question presented. As such, this audio response may be captured by the microphone and include the received passive voice access attempt that is then passed to the context gathering module. The passive voice access attempt is also passed to the voice contextual comparison module as described below, for example, for comparison to the acoustical background sounds stored in the sliding audio buffer for use in determining if the user is granted access to the information handling system as described herein. This presented question and required oral response result in an additional contextual obstacle for an unauthorized user attempting to use a recorded voice of an authorized user to gain access to the information handling system with this passive voice access attempt. In an embodiment, the question generation module may only present a question to the user via the video/graphics display device or speaker when, for example, the location context data module and location sensor has determined that the information handling system is located in a new setting or a public contextual environment in embodiments herein.

At block 508, the hardware processor of the information handling system may execute computer-readable program code of a voice contextual comparison module to execute a voice recognition algorithm to compare the received passive voice access attempt with an authentic voice sample of an authorized user of the information handling system. For example, the hardware processor may execute a biometric voice recognition algorithm such as execution of simple nearest neighbor algorithms, hidden Markov models, Gaussian mixture model algorithms, a trained recursive neural networks, pattern matching algorithms and others to analysis of tone, cadence, pace, phrasing, and other factors of detected speech of a passive voice access attempt as compared to one or more voice samples of an authorized user stored at the information handling system.

If at block 508, the voice contextual comparison module determines that the user's voice in the received passive voice access attempt does not match the authentic user's voice via the voice recognition algorithm, then the method proceeds to block 522 to deny access to the user and lock the information handling system in an embodiment. In another embodiment, if at block 508, the voice contextual comparison module determines that the user's voice in the received passive voice access attempt does match the authentic user's voice via the voice recognition algorithm, then the method proceeds to block 510 to determine if the user's voice is a recorded voice in the passive voice access attempt in embodiments herein.

The method 500 also includes, at block 510, the hardware processor executing computer-readable program code instructions of a context gathering module to capture operating conditions of the information handling system and environmental context where the information handling system is deployed. As described herein, this includes the context gathering module receiving data from one or more sensors at one or more of the information handling system mode context module, the location context data module, the video context data module, and the audio context data module. It is appreciated that a variety of types of data may be received via these sensors which may include environmental sensors of the environment around the information handling system as well as system sensors for operation or configuration of the information handling system. In one example embodiment, a location sensor, such as a GPS sensor or other location technology, may identify a location of the information handling system. For example, the information handling system may be at a park, at a café, in an office, on a train, moving, stationary, in a bag or suitcase, with the lid open or closed, or in any orientation.

The environmental context and operating conditions of the information handling system may be captured by use of each of these sensors with obtained data being used to define a contextual environment identification landscape of factors for input into a context environment ML module to compare to the received passive voice access attempt to determine a context matching score. In one example embodiment, a location sensor, such as a GPS sensor or other location technology, may identify a location of the information handling system with respect to noises expected in the vicinity as well as determination of whether a location is a known, secure location or an unknown, unsecure location. In other example embodiments, a wireless interface adapter may determine whether a public wireless network (such as public WiFi) or a secure private network is wirelessly coupled. In other embodiments, the hardware processor may execute the computer-readable program code of an audio data module to determine characteristic sounds from the buffered acoustical background expected to be in the background noise of the received passive voice access attempt as input into the context environment ML module to compare to the received passive voice access attempt to determine a context matching score for the background context of the passive voice access attempt. Further sensors may include a camera image from a video data module as well as various system sensors to detect orientation, light levels, configuration (e.g., lid open or lid closed), or operation of hardware component systems (e.g., playing streaming video or executing other software applications) as input into the context environment ML module to compare to the received passive voice access attempt to determine a context matching score.

In an embodiment, and as part of the execution of the computer-readable program code instructions of the context gathering module, a received signal strength indicator (RSSI) sensor may be used to determine if a Bluetooth® (BT) device that was previously registered at the information handling system or whether any BT device not previously registered with the information handling system is detected. Where a previously paired and registered BT device is detectable as being present near the information handling system, this data may indicate that the attempted access to the information handling system should be granted. However, where a BT device that has not been registered with the information handling system is detected by the RSSI sensor, this additional data may indicate that the attempted access should be suspected.

At block 512, the method 500 includes the hardware processor executing the computer-readable program code of the context gathering module to provide, as input, the operating conditions of the information handling system and environmental context sensor data for the information handling system into a contextual environment ML model with the background noise of the received passive voice access attempt to generate a context matching score reflecting confidence level that the background noises reflect the environment identification landscape of the operating conditions and the environmental context sensor data for the information handling system. In addition, the oral response in the received passive voice access attempt and an expected answer may be input into the contextual environment ML model as part of further determination of a context matching score. It is appreciated that the context environment ML module may include any type of machine learning technology that may learn from the various types of data received from the information handling system mode context module, the location context data module, the video context data module, and the audio context data module and correlate that to expected background noises and contextual data input for a correlation score such that the context matching score is generated. In some embodiments, the correlation of the received passive voice access attempt to the operating conditions or environmental context sensor data that there is low confidence that the background noise in the received passive voice access attempt matches suggesting denial of access. This low confidence may be further compounded with the contextual environment ML model determining a mismatch between the expected answer to the question presented to the user and the oral response in the received passive voice access attempt. In other embodiments, the correlation may be good between the received passive voice access attempt and the operating conditions or environmental context sensor data of the information handling system such that chances improve towards grant of access. A confidence level may be increased by the contextual environment ML model determining a match between the expected answer to the question presented to the user and the oral response in the received passive voice access attempt. In yet other embodiments, the confidence level may be inconclusive.

Further, environmental sensor data may be used for weighting during processing input in the context environment ML module to compare to the received passive voice access attempt to determine the context matching score for the passive voice access attempt. For example, location sensor data such as GPS data, may be used to determine that the information handling system is located in an unknown, unsecure location such as a public location with a chance of unauthorized user access attempts. With such location sensor data, for example, the question may have been presented to the user in the first place and a weighting factor may be applied to bias determination of the context matching score by the context environment ML module based on confidence that there is a matching correlation between oral response in the received passive voice access attempt and the expected answer such that a match yields higher confidence it is an authentic user's voice and not a recorded voice in some embodiments for a higher context matching score. Other examples of weighting are contemplated, such as environmental sensor data indicating that the information handling system is in an unknown or unsecure location decreasing confidence for a low context matching score.

At block 514, the hardware processor executes the computer-readable program code of the voice contextual comparison module to compare the buffered acoustical background sounds with the background noise of the passive voice access attempt to generate a voice background matching score. In an embodiment, the voice contextual comparison module conducts a spectral analysis of the noise signature of the buffered acoustical background sounds recorded and saved in the sliding audio buffer with relative recency, such as within the previous several seconds or minutes before a received passive voice access attempt in an embodiment. This spectral noise signature is matched with the background noise in the received passive voice access attempt. For example, in an embodiment, execution of an ASR module may determine speech and non-speech parts of a received passive voice access attempt to delineate the non-speech background noise parts. In other embodiments, comparison of spectral signatures may be made between the buffered acoustical background sounds and the combined voice and background noise portions of the passive voice access attempt for comparison of the background noise component. A difference in this spectral signature will yield to a low correlation and a lowered voice background matching score in an embodiment. For example, a recorded user's voice may have been recorded at a different time such as during a background noise level that is a louder or quieter environment than the buffered acoustical background sounds stored at the sliding audio buffer. Thus, this will yield a mismatch in spectral signature.

In another embodiment, a recording of a user's voice may be done surreptitiously, such as in a pocket or under some papers resulting in a muffled user's voice or different background noises in the passive voice access attempt than the buffered acoustical background sounds stored at the sliding audio buffer. This again may yield a mismatch in spectral signature and a low voice background matching score.

In another embodiment, identifiable noises in the buffered acoustical background may have a particular spectral signature that may be compared for in the received passive voice access attempt by the voice contextual comparison module. For example, birds, car noises, sounds of an air conditioning system, or other environmental noise may provide a particular spectral signature in the buffered background acoustical sounds that may be compared to the received passive voice access attempt and background noise. This again may yield a mismatch in spectral signature and a low voice background matching score in some embodiments.

In another embodiment, microphone beamforming of incoming sound for the captured passive voice access attempt from one beamforming microphone or plural microphones may be conducted with the digital signal processing by the voice contextual comparison module to determine a voice origination location and scan the sound signature away to obtain background noise in the passive voice access attempt. This may further provide the voice contextual comparison module background noise and spectral signature in the passive voice access attempt for comparison to a spectral signature of the buffered acoustical background sounds stored at the sliding audio buffer. This again may yield a mismatch in spectral signature and a low voice background matching score in some embodiments.

At block 516, the hardware processor may execute the computer-readable program code of the voice contextual comparison module to compare the combined context matching score and voice background matching score to a threshold access authorization confidence score to determine if access should be granted to the information handling system. As described herein, the output from the context environment ML module is used to influence the overall confidence score of authenticity of the passive voice access attempt such that a low score may result in the user not being granted access to the information handling system and the information handling system being locked. In example embodiments, the context matching score and voice background matching score may be combined by summation, normalization and summation, weighted summation, or another method to compare with the threshold access authorization confidence score. The threshold access authorization confidence score may be set accordingly such that combined context and voice background matching scores prevents access due to the invalidity of the passive voice access attempt either not matching with a buffered acoustical background sample saved with recency in the sliding audio buffer, not matching with operating conditions or contextual environmental sensor data for the information handling system, or both, to a high degree of confidence. In one example embodiment, the combined context matching score and voice background matching score must reach a high degree confidence threshold access authorization confidence score, such as 90%, 95%, or 98% confidence determination that the passive voice access attempt is an authentic user's voice and not a recording in one example embodiment. It is contemplated that any level of threshold access authorization confidence score may be used depending on desired or required security. A high combined context and voice background matching score may result in the user being granted access to and control of the information handling system. The threshold access authorization confidence score may be set such that combined context and voice background matching scores provides access when the passive voice access attempt matches well with a buffered acoustical background sample saved with recency in the sliding audio buffer, matches well with operating conditions or contextual environmental sensor data for the information handling system, or both occur for a cumulative high confidence matching in various embodiments herein.

Turning to block 518, when the combined context matching score and voice background matching score do not reach a threshold access authorization confidence score such that the passive voice access attempt is determined to likely be a recorded user's voice from an unauthorized user, the method proceeds to block 520. When the combined context matching score and voice background matching score do meet a threshold access authorization confidence score such that the passive voice access attempt is likely to be the authentic user's voice and not recorded, the method proceeds to block 522. Thus, at block 518, the hardware processor may determine if the context matching score and voice background matching score meets or exceeds the threshold access authorization confidence score that the passive voice access attempt is authentic and not recorded.

Where the context matching score and voice background matching score did not meet or exceed the threshold access authorization confidence score, the method 500 continues to block 520 with the hardware processor locking the information handling system. At block 520, the passive voice access attempt and user are denied access to the information handling system. When the information handling system is locked, the hardware processor may cause the information handling system to enter a secure state where access to its desktop, applications, and files is restricted until a valid authentication method is provided. In those example embodiments presented herein, this valid authentication method may include, at block 506, the authorized user once again providing passive voice access audio and the background audio being captured by the microphone that is determined to be authentic and includes a well-correlated oral response to a question presented to the user. Manual entry of passwords or other security measures may be required.

Where the context matching score and voice background matching score did meet or exceed the threshold access authorization confidence score, the method 500 continues to block 522. At block 522, access is granted to the user to operate the information handling system. The systems and methods described herein, therefore, prevent unauthorized access to the information handling system via a recorded voice used in place of a real and authorized user. These systems and methods distinguish a live person's voice from a recorded voice even if the recorded voice is that of the authorized user. This, therefore, increases the security of the information handling system thereby preventing unauthorized access to potentially sensitive information stored on the information handling system.

The method 500 may continue to block 524 to determine if the information handling system is still initiated. Where the information handling system is still initiated, the method 500 proceeds to block 504 to monitor acoustic background sounds and for later passive voice access attempts if a period of inactivity has expired. The method may proceed according to embodiments described herein. Where the information handling system is no longer initiated, the method 500 may end.

The blocks of the flow diagrams of FIGS. 4 and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system executing computer-readable program code instructions to prevent passive voice access by a recorded voice to the information handling system comprising:

a hardware processor, a data storage device, and a power management unit (PMU) to provide power to the hardware processor and data storage device;

a microphone to capture acoustical background sounds and buffer the acoustical background sounds in a sliding audio buffer;

the hardware processor to execute computer-readable program code of a context gathering module to capture operating conditions of the information handling system and environmental location context sensor data for the information handling system via a plurality of environment detection sensors as input to a contextual environment machine learning (ML) model with an passive voice access attempt including background noise recorded by the microphone to generate context matching score for the passive voice access attempt;

the hardware processor to execute computer-readable program code instructions of a voice contextual comparison module to:

compare the buffered acoustical background sounds to background noise within the passive voice access attempt captured by the microphone to generate a voice background matching score for the passive voice access attempt; and compare the voice background matching score and the context matching score to a threshold access authorization confidence score to determine if access should be granted to the information handling system;

the hardware process to deny access when the voice background matching score and the context matching score for the passive voice access attempt do not meet the threshold access authorization confidence score.

2. The information handling system of claim 1 further comprising:

the hardware processor to execute computer-readable program code of an automatic speech recognition (ASR) module to delineate between the background noise within the passive voice access attempt and a user's voice within the passive voice access attempt; and the hardware processor to execute computer-readable program code instructions of the voice contextual comparison module to compare the buffered acoustical background sounds to the background noise delineated from pauses in speech within the passive voice access attempt.

3. The information handling system of claim 1 further comprising:

the hardware processor to execute the computer-readable program code instructions of the voice contextual comparison module to identify specific characteristic sounds within the buffered acoustical background sounds to identify a contextual environment identification landscape as input for comparison with the background noise within the passive voice access attempt by the contextual environment machine learning (ML) model for the context matching score.

4. The information handling system of claim 1 further comprising:

the hardware processor to execute the computer-readable program code instructions of an information handling system mode module in the context gathering module to provide data describing current orientation and hardware operations within and orientation of the information handling system as the operating conditions of the information handling system as input for comparison with the background noise within the passive voice access attempt by the contextual environment machine learning (ML) model for the context matching score.

5. The information handling system of claim 1 further comprising:

the hardware processor to execute the computer-readable program code instructions of a location data module in the context gathering module to provide data describing a location of the information handling system from a location sensor including a global positioning system sensor to identify a contextual environment identification landscape as input for comparison with the background noise within the passive voice access attempt by the contextual environment machine learning (ML) model for the context matching score.

6. The information handling system of claim 1 further comprising:

the hardware processor to execute the computer-readable program code instructions of a video data module in the context gathering module to provide data describing a visual scene around the information handling system captured by a video camera to identify a contextual environment identification landscape as input for comparison with the background noise within the passive voice access attempt by the contextual environment machine learning (ML) model for the context matching score.

7. The information handling system of claim 1 further comprising:

the hardware processor to execute the computer-readable program code instructions of the voice contextual comparison module to determine if a user's voice in the passive voice access attempt matches an authorized voice of the user via execution of a voice recognition algorithm before executing to compare the buffered acoustical background sounds to the background noise within the passive voice access attempt.

8. The information handling system of claim 1 further comprising:

the hardware processor to execute the computer-readable program code instructions a question generation module to present a question, selected from a plurality of questions, to the user and instructions to provide an oral response to the question;

the microphone to record the passive voice access attempt including the oral response from the user; and the hardware processor to input the response to the question into the contextual environment ML model with an expected answer to generate the context matching score.

9. A method executing computer-readable program code instructions to prevent passive voice access with a recorded voice to the information handling system comprising:

capturing, via a microphone, acoustical background sounds and buffering the acoustical background sounds in a sliding audio buffer;

capturing, via the microphone, an passive voice access attempt;

executing computer-readable program code instructions of a voice recognition algorithm to determine if a user's voice in the passive voice access attempt matches an authorized voice of the user;

executing computer-readable program code, via the hardware processor of a context gathering module to capture operating conditions of the information handling system and environmental location context sensor data for the information handling system via a plurality of environment detection sensors as input to a contextual environment machine learning (ML) model with the passive voice access attempt including background noise to generate context matching score for the passive voice access attempt;

executing computer-readable program code instructions of a voice contextual comparison module to compare the buffered acoustical background sounds to background noise within the passive voice access attempt to generate a voice background matching score for the passive voice access attempt;

executing computer-readable program code instructions of the voice contextual comparison module to compare the voice background matching score and the context matching score to a threshold access authorization confidence score; and granting access to the information handling system when user's voice in the passive voice access attempt matches the authorized voice of the user and when the voice background matching score and the context matching score for the passive voice access attempt meets the threshold access authorization confidence score.

10. The method of claim 9 further comprising:

denying access to the information handling system when user's voice in the passive voice access attempt does not match the authorized voice of the user or when the voice background matching score and the context matching score for the passive voice access attempt does not meet the threshold access authorization confidence score.

11. The method of claim 9 further comprising:

executing computer-readable program code of an automatic speech recognition (ASR) module to delineate between the background noise within the passive voice access attempt and a user's voice within the passive voice access attempt; and executing computer-readable program code instructions of the voice contextual comparison module to compare the buffered acoustical background sounds to the background noise delineated from pauses in speech within the passive voice access attempt.

12. The method of claim 9 further comprising:

receiving location sensor data from a location data module describing a location where the information handling system is deployed as input to weight the execution of the contextual environment machine learning (ML) model with the background noise within the passive voice access attempt to generate context matching score for the passive voice access attempt, where the weighting bias increases the context matching score if the location is a known secure location.

13. The method of claim 9 further comprising:

executing the computer-readable program code instructions of the voice contextual comparison module to generate a sub-audible tone with a speaker modulated with a user's voice sample recorded with the buffered acoustic background sounds;

generating the sub-audible tone with the speaker when voice is detected during the passive voice access attempt; and executing the computer-readable program code instructions of the voice contextual comparison module to determine when the passive voice access attempt includes a twice modulated sub-audio tone to deny access to the information handling system and determine when the passive voice access attempt includes a once modulated sub-audio tone to grant access to the information handling system.

14. The method of claim 9 further comprising:

executing computer-readable program code instructions of a question generation module to display on a video display or play on a speaker to a user a question, selected from a plurality of questions, and instructions to provide an oral response to the question; and recording the passive voice access attempt including the oral response to the question and input the response to the question into the contextual environment ML model with an expected answer to generate the context matching score.

15. An information handling system executing computer-readable program code instructions to prevent passive voice access by a recorded voice to the information handling system comprising:

a hardware processor, a data storage device, and a power management unit (PMU) to provide power to the hardware processor and data storage device;

a microphone to capture acoustical background sounds and buffer the acoustical background sounds in a sliding audio buffer;

the microphone to capture an passive voice access attempt;

the hardware processor to execute computer-readable program code of an automatic speech recognition (ASR) module to delineate between the background noise within the passive voice access attempt and a voice of a user in the passive voice access attempt;

the hardware processor to execute computer-readable program code of a context gathering module to capture operating conditions of the information handling system and environmental location context sensor data for the information handling system via a plurality of environment detection sensors as input to a contextual environment machine learning (ML) model with the background noise within the passive voice access attempt to generate context matching score for the passive voice access attempt;

the hardware processor to execute computer-readable program code instructions of a voice contextual comparison module to:

compare the buffered acoustical background sounds to background noise delineated from the recorded passive voice access attempt to generate a voice background matching score for the passive voice access attempt; and compare the voice background matching score and the context matching score to a threshold access authorization confidence score to determine if access should be granted to the information handling system; and the hardware process to grant access to the information handling system when the voice background matching score and the context matching score for the passive voice access attempt meet the threshold access authorization confidence score.

16. The information handling system of claim 15 further comprising:

the hardware processor to execute the computer-readable program code instructions of the voice contextual comparison module to determine if a user's voice in the passive voice access attempt matches an authorized voice of the user via execution of a voice recognition algorithm before granting access to the information handling system.

17. The information handling system of claim 15 further comprising:

the hardware processor to execute the computer-readable program code instructions of the voice contextual comparison module to identify specific sounds from the buffered acoustical background sounds as environmental location context sensor data for the information handling system input into the contextual environment ML model with the background noise with the passive voice access attempt to generate context matching score.

18. The information handling system of claim 15 further comprising:

the environmental location context sensor data for the information handling system includes location sensor data from a location data module describing a location where the information handling system is deployed, and configuration sensor data from an information mode module describing current orientation and hardware operations within the information handling system.

19. The information handling system of claim 15 further comprising:

the environmental location context sensor data for the information handling system includes location sensor data from a location data module describing a location where the information handling system is deployed as input to weight the execution of the contextual environment machine learning (ML) model with the background noise within the passive voice access attempt to generate context matching score for the passive voice access attempt, where the weighting bias increases the context matching score if the location is a known secure location.

20. The information handling system of claim 15 further comprising:

the hardware processor to execute the computer-readable program code instructions of the voice contextual comparison module to generate a sub-audible tone with a speaker modulated with a user's voice sample recorded with the buffered acoustic background sounds;

the hardware processor to generate the sub-audible tone when voice is detected during the passive voice access attempt; and the hardware processor to execute the computer-readable program code instructions of the voice contextual comparison module to determine if the passive voice access attempt includes a twice modulated sub-audio tone to deny access to the information handling system.

* * * * *